US007294600B2

(12) United States Patent
Lee et al.

(10) Patent No.: US 7,294,600 B2
(45) Date of Patent: Nov. 13, 2007

(54) SUPPORTED HYBRID METALLOCENE CATALYST, METHOD FOR PREPARING THE SAME, AND METHOD FOR PREPARING POLYOLEFIN USING THE SAME

(75) Inventors: Ki-Soo Lee, Daejeon-city (KR); Hyo-Sun Lee, Daejeon-city (KR); Eun-Jung Lee, Seoul (KR); Sang-Woo Lee, Daejeon-city (KR); Choong-Hoon Lee, Daejeon-city (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 10/527,581

(22) PCT Filed: Mar. 24, 2004

(86) PCT No.: PCT/KR2004/000660

§ 371 (c)(1),
(2), (4) Date: Feb. 23, 2006

(87) PCT Pub. No.: WO2004/087770

PCT Pub. Date: Oct. 14, 2004

(65) Prior Publication Data

US 2006/0235171 A1 Oct. 19, 2006

(30) Foreign Application Priority Data

Apr. 1, 2003 (KR) ..................... 10-2003-0020428

(51) Int. Cl.

| | |
|---|---|
| ***C08F 4/02*** | (2006.01) |
| ***C08F 4/646*** | (2006.01) |
| ***C08F 4/6392*** | (2006.01) |

(52) U.S. Cl. ..................... 502/113; 502/120; 502/152; 526/116; 526/129; 526/160; 526/165; 526/943

(58) Field of Classification Search ............... 502/113, 502/152, 120; 526/116, 160, 165, 943, 129
See application file for complete search history.

(56) References Cited

U.S. PATENT DOCUMENTS

| | | | | |
|---|---|---|---|---|
| 5,719,241 | A | 2/1998 | Razavi et al. | |
| 5,768,291 | A | 6/1998 | Kelton et al. | |
| 5,786,291 | A * | 7/1998 | Speca et al. | 502/104 |
| 5,847,059 | A | 12/1998 | Shamshoum et al. | |
| 6,057,408 | A | 5/2000 | Winter et al. | |
| 6,384,161 | B1 | 5/2002 | Welch et al. | |

FOREIGN PATENT DOCUMENTS

| | | | |
|---|---|---|---|
| DE | 199 40 151 | A1 | 3/2001 |
| EP | 0619325 | A1 | 10/1994 |
| EP | 0 628 566 | A1 | 12/1994 |
| WO | WO-01/009200 | A1 | 2/2001 |

* cited by examiner

*Primary Examiner*—Caixia Lu
(74) *Attorney, Agent, or Firm*—Birch, Stewart, Kolasch & Birch, LLP

(57) ABSTRACT

The present invention relates to a supported metallocene catalyst used for preparing polyolefin whose physical properties and molecular weight distribution can be easily controlled, a method for preparing the same, and a method for preparing polyolefin using the same, more particularly to a support metallocene catalyst wherein at least two kinds of metallocenic transition compounds are supported on a metal oxide such as silica, a method for preparing the same, and a method for preparing polyolefin using the same.

72 Claims, 1 Drawing Sheet

[Fig. 1]
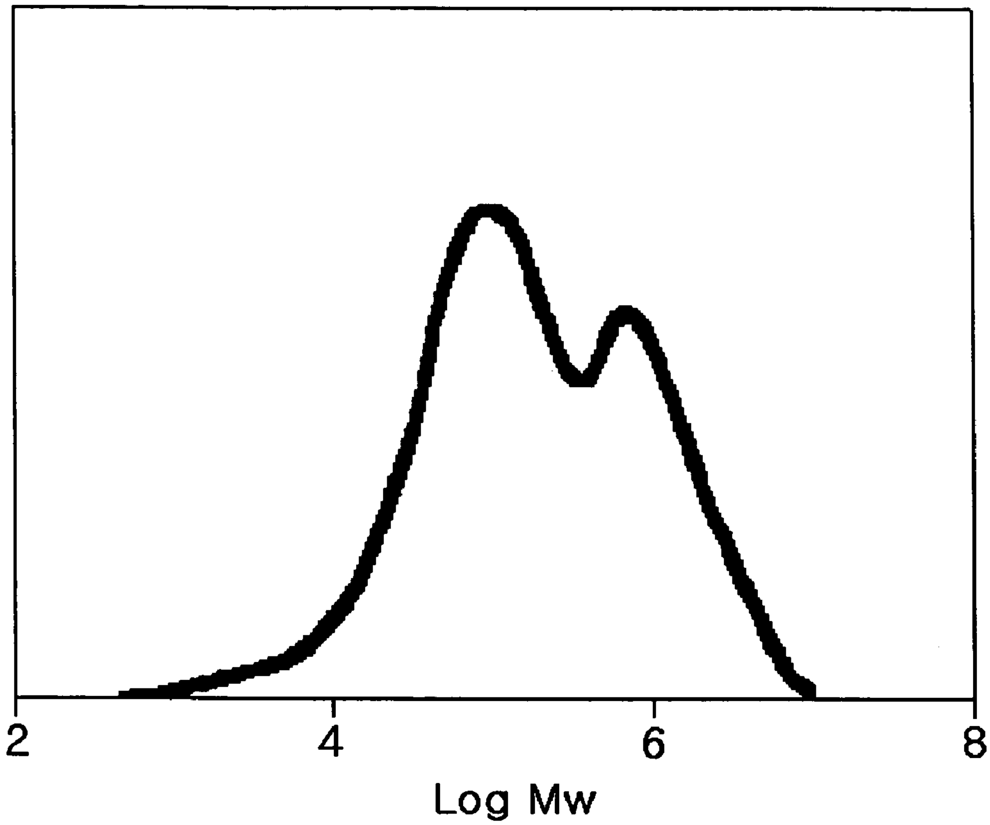
[Fig. 2]
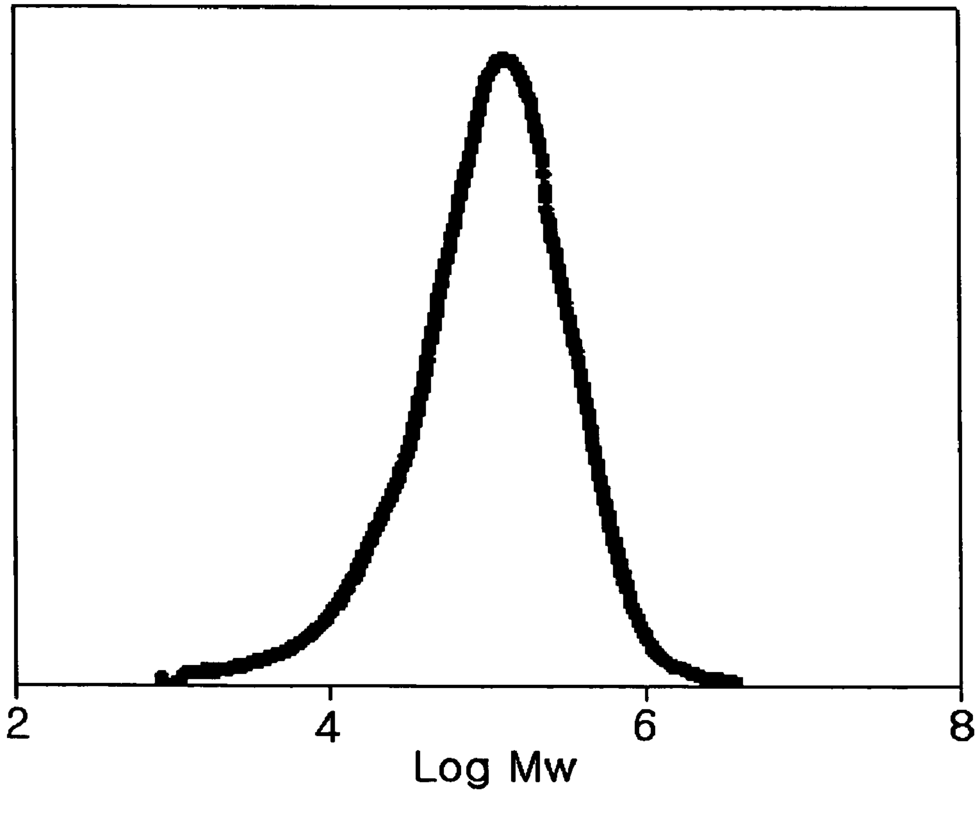

SUPPORTED HYBRID METALLOCENE CATALYST, METHOD FOR PREPARING THE SAME, AND METHOD FOR PREPARING POLYOLEFIN USING THE SAME

BACKGROUND OF THE INVENTION (a) Field of the Invention

The present invention relates to a supported metallocene catalyst used for preparing polyolefin whose physical properties and molecular weight distribution can be easily controlled, a method for preparing the same, and a method for preparing polyolefin using the same, more particularly to a supported metallocene catalyst wherein at least two kinds of metallocene compounds are supported on a metal oxide such as silica, a method for preparing the same, and a method for preparing polyolefin using the same.

(b) Description of the Related Art

The metallocene catalyst system comprises a main catalyst whose main component is a transition metal compound, mainly a Group IV metal, and an organometallic compound cocatalyst whose main component is aluminum. Such a catalyst offers a polymer having a narrow molecular weight distribution depending on the single site characteristics. The molecular weight and molecular weight distribution of polyolefin are important factors that determine the fluidity and mechanical properties that affect the physical properties and processability of a polymer. To manufacture a variety of polyolefin products, it is important to improve melt processability through molecular weight distribution control (C. A. Sperat, W. A. Franta, H. W. Starkweather Jr., *J. Am. Chem. Soc.,* 75, 1953, 6127). Especially for polyethylene, toughness, strength, environmental stress cracking resistance (ESCR), and so forth are very important. Therefore, a method of preparing a polyolefin having a bimodal or broad molecular weight distribution to enhance mechanical properties and processability has been proposed.

The polyolefin having a bimodal and broad molecular weight distribution is a polymer that has two average molecular weights, one of which is higher and the other lower. Conventionally, there have been many attempts to prepare a polymer having such a molecular weight distribution. They can be categorized into the following three groups.

First, a method of preparing two polyolefins having different molecular weights by post reaction or mixing has been proposed (U.S. Pat. No. 4,461,873). However, such physical mixing requires additional production cost. Also, because the gel content is high due the compatibility of the two polymers, it cannot be applied to manufacturing containers and films.

Second, a method of preparing a polyethylene having a broad molecular weight distribution or a bimodal molecular weight distribution by differing injected amounts of hydrogen gas and comonomers using more than two multistep reactors has been proposed (C. A. Sperat, W. A. Franta, H. W. Starkweather Jr., *J. Am. Chem. Soc.,* 75, 1953 6127, N. Kuroda, Y. Miyazaki, K. Matsumura, K. Jubo, M. Miyashi and T. Horie, 1979 Ger. 28,856,548). Although this method can solve the gel problem, the process is complex and the operation cost is high.

The third method, a method of mixing two different catalysts in a single reactor or applying more than two catalysts to a single support, is more useful than the above two methods. Most patents and literatures mention a metallocene compound and a Ziegler-Natta titanium compound supported on a single support (U.S. Pat. No. 6,444,605 B1, U.S. Pat. No. 6,399,531 B1, U.S. Pat. No. 6,417,129 B2, U.S. Pat. No. 6,399,723 B1, U.S. Pat. No. 5,614,456, Korea Patent Publication No. 1988-045993, Korea Patent Publication No. 1998-045994, Korea Patent Publication No. 1999-022334, Korea Patent Publication No. 2000-0042620).

A polyolefin prepared by this method has limited physical properties due to the specific polymerization characteristics of the Ziegler-Natta catalyst and the metallocene catalyst. For instance, when preparing a polyolefin using a metallocene catalyst, the stereoregularity, copolymerization characteristics, molecular weight, crystallinity, and so forth of the obtained polymer can be controlled by changing the ligand structure of the catalyst and the polymerization condition.

Accordingly, a polyolefin having ideal molecular weight distribution, stereo regularity, copolymerization characteristics, and so forth can be prepared by using several metallocene catalysts having specific characteristics. For the preparation of a polyolefin having a bimodal or broad molecular weight distribution using a metallocene catalyst, a method of using two different metallocene catalyst systems having different growth rate and termination rate constant has been proposed (J. A. Ewen, *Stud. Surf. Sci. & Catal.* vol. 1986 25, U.S. Pat. No. 6,384,161 B1). The Kaminsky group of Germany has reported that the molecular weight distribution (Mw/Mn) of ethylene polymerization has broadened from about 1.9 to 2.3 to about 4.1 to 10.0 when they used a hybrid metallocene catalyst system such as $Cp_2ZrCl_2$—$Cp_2HfCl_2$—MAO (A. Ahlers, W. Kaminsky, *Makromol. Chem., Rapid Commun.,* 9, 1988 457).

However, above-mentioned literatures and patents only disclose the polymerization using two catalysts. They just mention selection of organometallic compounds and homogeneous catalyst systems for controlling the molecular weight distribution and polymer properties, and they do not offer supported catalysts applicable to gas-phase and slurry processes.

The industrial polyolefin production processes can be classified into the high-pressure process, the solution process, the slurry process, the gas phase process, and so forth. With the development of the metallocene catalyst, there have been many attempts to produce polyolefin using these processes and just replacing the catalyst. Until recently, the metallocene catalyst is mostly used for the solution process, the gas phase process and the slurry process. The gas phase and the slurry processes require apparent density control of the polymer to improve the production unit per unit volume of the reactor. In addition, the fouling problem, or sticking of the polymer on the reactor wall, should be solved. The most common method for increasing the apparent density and solving the fouling problem is to fix the homogeneous metallocene catalyst on a solid support such as silica, alumina or a metal oxide.

Among them, silica is the most frequently used as a support. When a silica support is dried at high temperature, the hydroxyl group on the surface is removed as water and a siloxane group is obtained, as in the following Scheme 1. If the drying temperature is 200 to 500° C., only the easily removable hydroxyl group (—OH) is reversibly removed as water and the less reactive siloxane group is obtained. However, if the drying temperature is above 600° C., even the hardly removable hydroxyl group is forcibly removed as water and the siloxane group with a large ring strain and high reactivity is obtained (I-S. Chuang and G. E. Maciel, *Journal of American Chemical Society* 118, 1996, 401). The highly reactive siloxane group obtained by drying at the temperature over 600° C. reacts with an alkoxy silane group, as in Scheme 1 (J. Blmel, *Journal of American Chemical Society* 117, 1995, 2112; L. H. Dubois, *Journal of American Chemical Society* 115, 1993, 1190).

Scheme 1

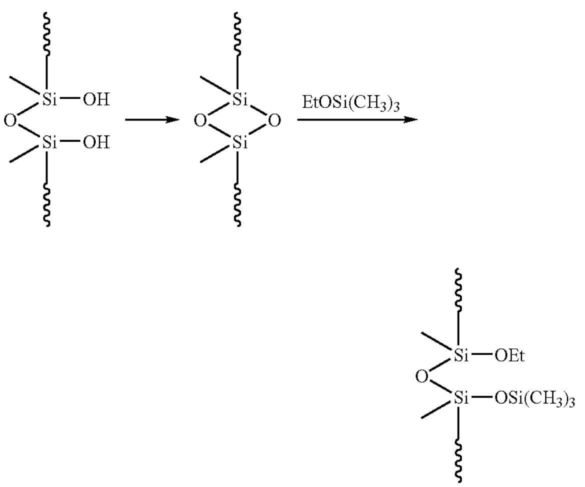

Here, the figure on the left is the ordinary silica, the figure on the center is the silica having a highly reactive siloxane group, which has been dried at a temperature over 600° C., and the figure on the right is the silica attached with an alkoxy silane group.

SUMMARY OF THE INVENTION

It is an object of the present invention to provide a supported hybrid metallocene catalyst, with which the final physical properties and the molecular weight distribution of polyolefin can be easily controlled, and a method for preparing the same.

It is another object of the present invention to provide a method for preparing polyolefin by applying a supported hybrid metallocene catalyst, which was obtained by sequentially adding two different metallocene compounds, to a single polymerization reactor, in order to improve the processability and the physical properties of polyolefin and to significantly reduce the polyolefin production cost by cutting down the production processes.

To attain the objects, the present invention provides a supported hybrid metallocene catalyst, in which at least two different metallocene compounds are supported on a single support, wherein:

at least one metallocene compound is supported on the support by a chemical bond of its ligand to the support surface; and the other metallocene compound is supported on the support by a chemical bond of its ligand to a cocatalyst chemically bonded to the support surface.

The present invention also provides the following two methods for preparing the supported hybrid metallocene catalyst:

The first method comprises:

a) a step of contacting a supported metallocene catalyst in which at least one metallocene compound is supported with a cocatalyst to prepare an activated supported metallocene catalyst; and b) a step of supporting at least one metallocene compound different from the metallocene compound of the step a) on the activated supported metallocene catalyst.

The second method comprises:

a) a step of contacting at least one metallocene compound with a cocatalyst to prepare an activated metallocene compound; and b) a step of supporting the activated supported metallocene compound on a supported metallocene catalyst in which at least one metallocene compound different from the metallocene compound of the step a) is supported.

The present invention also provides a supported hybrid metallocene catalyst for preparing polyolefin having a bimodal or broad molecular weight distribution, which is obtained by supporting a) a catalyst component on b) a support, wherein a) the catalyst component comprises:

i) a first metallocene compound having an acetal, ketal, tertiary alkoxyalkyl, benzyloxyalkyl, substituted benzyloxyalkyl, monothioacetal or monothioketal group;

ii) a second metallocene compound having a bridge linkage containing a Lewis base in cyclopentadiene, a cyclopentadiene derivative or a bridge group; and iii) an organometallic compound containing a group XIII metal; and b) the support has siloxane groups on the surface, on which the catalyst component is supported.

The present invention also provides the following two methods for preparing a supported hybrid metallocene catalyst for preparing polyolefin having a bimodal or broad molecular weight distribution:

The first method comprises:

a) a step of preparing a first supported catalyst by supporting a first metallocene compound having an acetal, ketal, tertiary alkoxyalkyl, benzyloxyalkyl, substituted benzyloxyalkyl, monothioacetal or monothioketal functional group on a support having siloxane groups on the surface;

b) a step of preparing an activated first supported catalyst by contacting the first supported catalyst with an organometallic compound cocatalyst containing a group XIII metal; and c) a step of supporting a second metallocene compound having a bridge linkage containing at least one Lewis base in cyclopentadiene, a cyclopentadiene derivative or a bridge group on the activated first supported catalyst to prepare a supported hybrid metallocene catalyst wherein the first metallocene compound and the second metallocene compound are supported.

The second method comprises:

a) a step of supporting a first metallocene compound having an acetal, ketal, tertiary alkoxyalkyl, benzyloxyalkyl, substituted benzyloxyalkyl, monothioacetal or monothioketal functional group on a support having siloxane groups on the surface to prepare a first supported catalyst;

b) a step of contacting a second metallocene compound having a bridge linkage containing at least one Lewis base in cyclopentadiene, a cyclopentadiene derivative or a bridge group with an organometallic compound cocatalyst containing a group XIII metal to prepare an activated second metallocene compound; and c) a step of supporting the activated second metallocene compound on the first supported catalyst to prepare a supported hybrid metallocene catalyst wherein the first metallocene compound and the second metallocene compound are supported.

The present invention also provides a method of olefin polymerization which comprises a step of polymerizing an olefinic monomer in the presence of a supported hybrid metallocene catalyst wherein at least two different metallocene compounds, which comprise a first metallocene compound whose ligand is supported to the support surface by chemical bonding, a second metallocene compound whose ligand is supported to a cocatalyst, which is chemically bonded to the support surface, by chemical bonding, a cocatalyst and a support, are supported on a single support.

The present invention also provides a method for preparing polyolefin having a bimodal or broad molecular weight distribution, which comprises a step of polymerizing an olefinic monomer in the presence of a supported hybrid metallocene catalyst wherein a catalyst component comprising:

i) a first metallocene compound having an acetal, ketal, tertiary alkoxyalkyl, benzyloxyalkyl, substituted benzyloxyalkyl, monothioacetal or monothioketal functional group;

ii) a second metallocene compound having a bridge linkage containing at least one Lewis base in cyclopentadiene, a cyclopentadiene derivative or a bridge group; and iii) an organometallic compound cocatalyst containing a group XIII metal is supported on a support having siloxane groups on the surface.

BRIEF DESCRIPTION OF THE DRAWINGS

FIG. 1 is a graph that shows the gel permeation chromatography (GPC) analysis for an olefin polymer prepared by using the supported hybrid metallocene catalyst of Example 7.

FIG. 2 is a graph that shows the gel permeation chromatography (GPC) analysis for an olefin polymer prepared by using the supported metallocene catalyst of Comparative Example 2.

DETAILED DESCRIPTION OF THE PREFERRED EMBODIMENTS

Hereinafter, the present invention is described in more detail.

The present invention provides a supported hybrid metallocene catalyst which enables production of polyolefin having ideal properties and molecular weight distribution and controls the polymer structure better than the conventional supported hybrid catalyst of Ziegler-Natta and metallocene compound.

The present invention provides a supported hybrid catalyst consisting of at least two kinds of metallocene catalysts having different polyolefin polymerization characteristics, and thus enables preparation of polyolefins having a variety of properties and molecular weight distributions (broad and bimodal molecular weight distribution). The present invention also provides a supported hybrid catalyst which can easily control physical properties of prepared olefin polymers, a method for preparing the same, and a method of olefin polymerization using the same.

More specifically, the present invention provides offers a supported catalyst capable of easily controlling molecular weight distribution in a single reactor by supporting a metallocene compound inducing a low molecular weight polyolefin and a metallocene compound inducing a high molecular weight polyolefin on a single support together with a cocatalyst. Preferably, the low molecular weight polyolefin has a molecular weight ranging from 1,000 to 100,000, and the high molecular weight polyolefin has a molecular weight higher than that of the low molecular weight polyolefin, ranging from 10,000 to 1,000,000.

First, a metallocene compound having a functional group such as an alkoxy group is supported on a support having highly reactive siloxane groups which have been generated during drying at high temperature as exemplified in Scheme 1, as shown in the following Scheme 2 (Korea Patent Publication No. 10-1998-0025282). Then, it is reacted with an alkylaluminum compound such as methylaluminoxane to prepare an activated supported catalyst to obtain a hybrid catalyst. The result is: a support with a trace of hydroxyl groups on the surface can be used, so that various side reactions due to the hydroxyl groups can be prevented, and therefore the supporting efficiency can be maximized. A metallocene catalyst having a different polymerization characteristic and a bridge linkage is supported to the activated supported catalyst.

More specifically, a first metallocene compound having a functional group such as an alkoxy group and capable of inducing low molecular weight is supported on a silica support having highly reactive siloxane groups on the surface, as seen in the following Scheme 2 or Scheme 3. Then, a cocatalyst such as an alkylaluminum compound and, subsequently, a second metallocene compound having a bridge linkage capable of inducing high molecular weight are reacted to prepare a new type of supported hybrid catalyst. This supported hybrid catalyst is used to prepare polyolefin having a bimodal or broad molecular weight distribution.

Scheme 2

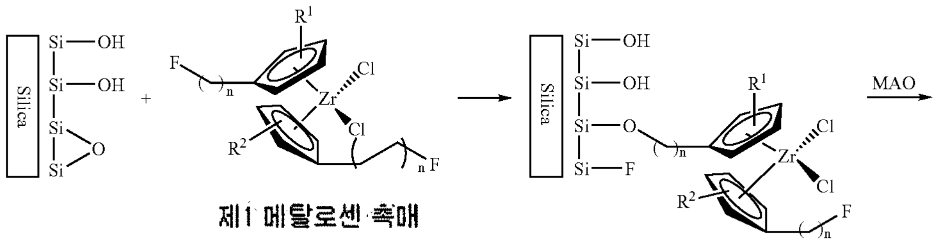

-continued
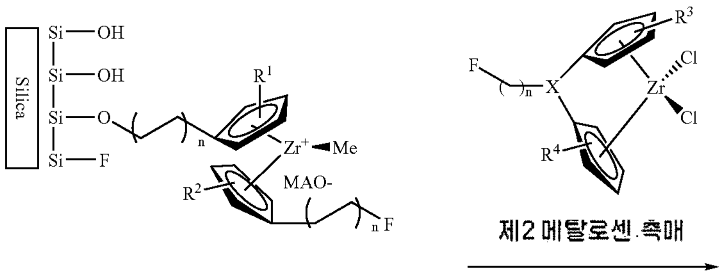
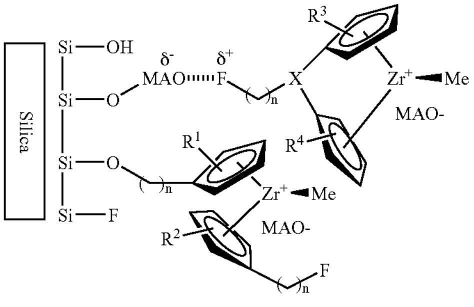
or
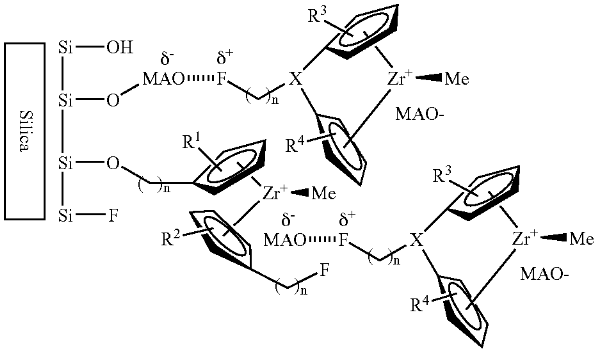
Scheme 3
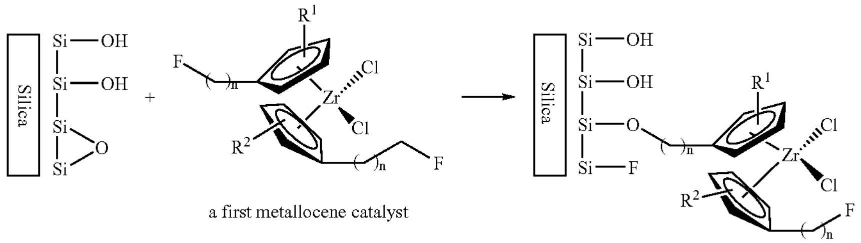

-continued

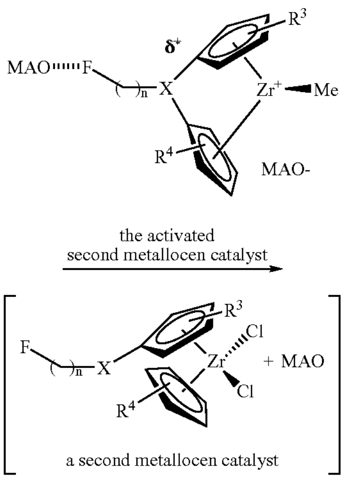

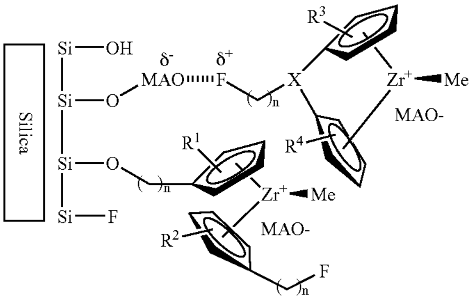

or

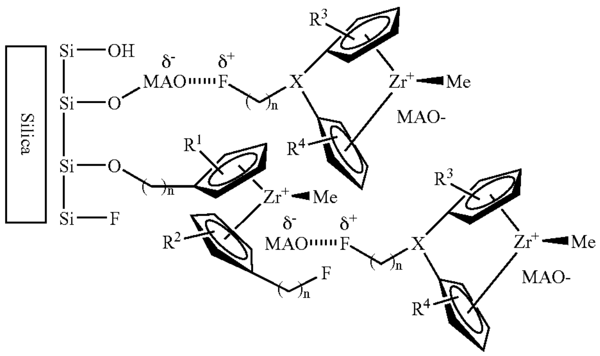

In Scheme 2 and Scheme 3, F is a functional group and X is a bridge group connecting two cyclopentadienyl groups.

Therefore, the supported hybrid metallocene catalyst of the present invention is a hybrid catalyst wherein a ligand of the first metallocene compound is supported on the support surface by chemical bonding and a ligand of the second metallocene compound is supported on a cocatalyst chemically bonded to the support surface by chemical bonding.

In general, the first metallocene catalyst having a functional group such as an alkoxy group induces low molecular weight polyolefin, and is represented by the following Chemical Formula 1:

$$(C_5R^1)_p(C_5R^2)MQ_{3-p}$$ Chemical Formula 1

Here,

M is a group IV transition metal;

each of $(C_5R^1)$ and $(C_5R^2)$ is cyclopentadienyl; cyclopentadienyl wherein two neighboring carbon atoms of $C_5$ are connected by a hydrocarbyl radical to form one or more $C_4$ to $C_{16}$ rings; or a substituted cyclopentadienyl ligand;

each of $R^1$ and $R^2$ is identical or different and a substituent selected from hydrogen radical, $C_1$ to $C_{40}$ alkyl, cycloalkyl, aryl, alkenyl, alkylaryl, arylalkyl, or arylalkenyl radical; and at least one hydrogen radical comprised in the substituent of $R^1$ and $R^2$ is further substituted by a radical represented by the following Chemical Formula a, the following Chemical Formula b, or the following Chemical Formula c;

Q is a halogen radical; a $C_1$ to $C_{20}$ alkyl radical, alkenyl radical, aryl radical, alkylaryl radical, arylalkyl radical; or a $C_1$ to $C_{20}$ alkylidene radical; and P is 0 or 1:

Chemical Formula a

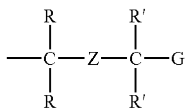

Here,

Z is an oxygen atom or a sulfur atom;

each of R and R' is identical or different hydrogen radical; $C_1$ to $C_{40}$ alkyl, cycloalkyl, aryl, alkenyl, alkylaryl, arylalkyl; or arylalkenyl radical; and the two R's may be connected to form a ring;

G is a $C_1$ to $C_{40}$ alkoxy, aryloxy, alkylthio, arylthio, phenyl or substituted phenyl, and may be connected to R' to form a ring;

if Z is a sulfur atom, G should be alkoxy or aryloxy; and if G is alkylthio, arylthio, phenyl or substituted phenyl, Z should be an oxygen atom; and Chemical Formula b

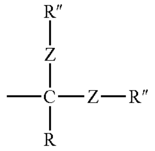

Here,

Z is an oxygen atom or a sulfur atom, and at least one of the two Zs is an oxygen atom;

each of R and R'' is identical or different hydrogen radical; $C_1$ to $C_{40}$ alkyl, cycloalkyl, aryl, alkenyl, alkylaryl, arylalkyl or arylalkenyl radical;

R and R'' may be connected to form a ring; and unless both R''s are hydrogen radicals, they may be connected to form a ring; and Chemical Formula c

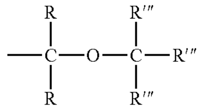

Here, each of R and R''' is identical or different hydrogen radical; $C_1$ to $C_{40}$ alkyl, cycloalkyl, aryl, alkenyl, alkylaryl, arylalkyl or arylalkenyl radical;

two neighboring R'''s may be connected to form a ring; and if at least one of Rs is a hydrogen radical, all R'''s are not hydrogen radicals, and if at least one of R'''s is a hydrogen radical, all Rs are not hydrogen radical.

A typical example of the first metallocene compound represented by Chemical Formula 1 is $[A—O—(CH_2)_a—C_5H_4]_2ZrCl_2$ or $[A—O—(CH_2)_a—C_9H_6]ZrCl_3$. More preferably, a is an integer of 4 to 8; and A is selected from a group consisting of methoxymethyl, t-butoxymethyl, tetrahydropyranyl, tetrahydrofuranyl, 1-ethoxyethyl, 1-methyl-1-methoxyethyl or t-butyl (Lee, B. Y., Oh, J. S., *Organomet Chem.*, 552, 1998, 313).

Typical but non-restrictive examples of the first metallocene compound of the present invention are as follows:

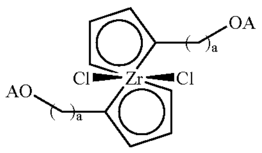
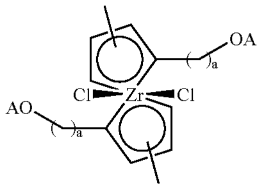
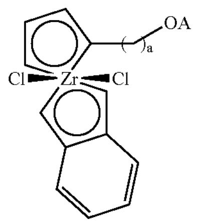
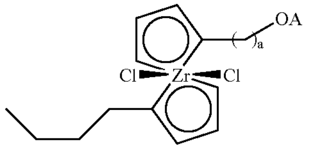
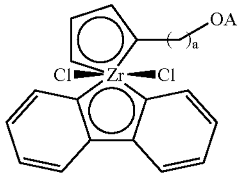
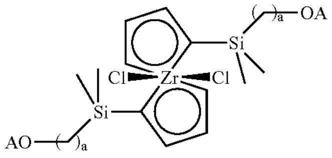
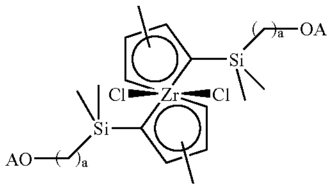
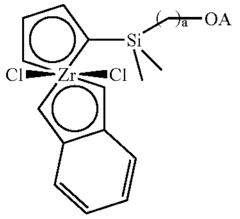

-continued

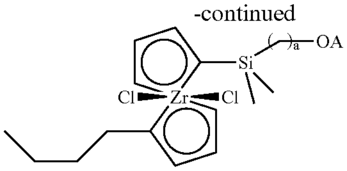
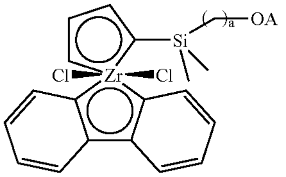
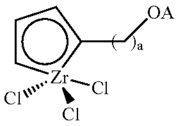
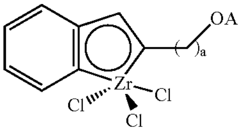
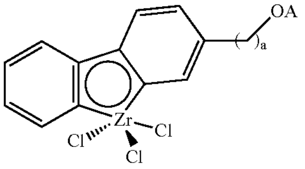

Here, definitions of A and a are the same as mentioned above.

The support used in the present invention is dried at high temperature, and thus has highly reactive siloxane groups on the surface. To be specific, silica, silica-alumina, silica-magnesia, and so forth, which have been dried at high temperature, can be used. The support may comprise oxides such as $Na_2O$, $K_2CO_3$, $BaSO_4$ and $Mg(NO_3)_2$, carbonates, sulfates or nitrates.

The most prominent characteristic of the present invention is the highly reactive siloxane groups on the support surface obtained by removing water and OH group by flowing vacuum-dried or dried air, nitrogen or inert gas at high temperature. The drying temperature is 300 to 1000° C., preferably 300 to 800° C., and more preferably 600 to 800° C.

It is better to have less support alcohol groups (—OH) on the support surface, however it is practically impossible to remove them all. Preferably the alcohol group (—OH) content is 0.1 to 10 mmol/g, more preferably 0.1 to 1 mmol/g, and most preferably 0.1 to 0.5 mmol/g. The alcohol group (—OH) content can be controlled by the support manufacture condition or drying condition (temperature, time and drying methods such as vacuum drying or spray drying). In order to prevent side reaction due to the trace OH group remaining after drying, it is possible to use a support whose alcohol groups (—OH) are removed chemically while preserving the highly reactive siloxane groups (Korea Patent Publication No. 2001-003325).

The first metallocene compound is reacted with the support to prepare a first supported catalyst. The first metallocene compound is contacted with the support having highly reactive siloxane groups on the surface. From the reaction of the first metallocene compound and the support, one of the carbon-oxygen bonds present in a radical represented by Chemical Formula a, Chemical Formula b or Chemical Formula c is broken, and a new chemical bonding is formed to give the first supported catalyst.

The contact reaction of the first metallocene compound and the support can be carried out with or without a solvent.

For the solvent, aliphatic hydrocarbon solvents such as hexane and pentane, aromatic hydrocarbon solvents such as toluene and benzene, chlorine substituted hydrocarbon solvents such as dichloromethane, ether solvents such as diethyl ether and THF, and other organic solvents such as acetone and ethyl acetate can be used. Preferably, hexane, heptane, toluene or dichloromethane is used.

The reaction temperature can range from −30° C. to 150° C., preferably from room temperature to 100° C., and more preferably from 70 to 90° C. The reacted supported catalyst can be used after removing the reaction solvent by filtration or distillation under reduced pressure. If necessary, it can be Soxhlet filtrated with an aromatic hydrocarbon such as toluene.

The first supported catalyst of the present invention can be used for olefin polymerization without any treatment. The supported hybrid metallocene catalyst of the present invention is obtained by supporting a second metallocene compound, which is an organometallic compound capable of inducing high molecular weight polyolefin, on the first supported catalyst The second metallocene compound can be supported on the first supported catalyst by two methods.

The first method is to prepare an activated first supported catalyst by activating the first supported catalyst with a cocatalyst as in Scheme 2, and then support the second metallocene compound on the first supported catalyst by contact reaction in a solvent.

The second method is to prepare an activated second metallocene compound by activating the second metallocene compound with a cocatalyst as in Scheme 3, and then support the second metallocene compound on the first supported catalyst by contact reaction in a solvent.

When activating the first supported catalyst or the second metallocene compound, an organometallic compound containing a group XIII metal is used as a cocatalyst. It is a cocatalyst commonly used for olefin polymerization using a metallocene catalyst. Preferably, a compound represented by the following Chemical Formula 4, Chemical Formula 5 or Chemical Formula 6 is used as a cocatalyst, alone or in combination.

$$[Al(R^6)—O]_n— \qquad \text{Chemical Formula 4}$$

Here, $R^6$ is a $C_1$ to $C_{20}$ hydrocarbyl radical substituted by identical or different halogen radical, $C_1$ to $C_{20}$ hydrocarbyl radical or halogen; and a is an integer larger than 2.

This compound may have a linear, circular or network structure.

$$M'(R^7)_3 \qquad \text{Chemical Formula 5}$$

Here,

M' is aluminum or boron; and $R^7$ is a $C_1$ to $C_{20}$ hydrocarbyl radical substituted by identical or different halogen radical, $C_1$ to $C_{20}$ hydrocarbyl radical or halogen.

$$[L—H]^+[M'E_4]^- \text{ or } [L]^+[M'E_4]^- \qquad \text{Chemical Formula 6}$$

Here,

L is a neutral or cationic Lewis acid;

H is a hydrogen atom;

M' is a group XIII element, such as aluminum and boron; and

E is a $C_6$ to $C_{40}$ aryl radical substituted by one or more $C_1$ to $C_{20}$ hydrocarbyl radicals containing a halogen radical, $C_1$ to $C_{20}$ hydrocarbyl, alkoxy, phenoxy radical, nitrogen, phosphorus, sulfur or oxygen atom, and the four Es may be identical or different.

For the compound represented by Chemical Formula 4, there are methylaluminoxane (MAO), ethylaluminoxane, isobutylaluminoxane, butylaluminoxane, and so forth.

For the alkyl metal compound represented by Chemical Formula 5, there are trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and so forth.

For the compound represented by Chemical Formula 6, there are triethylammoniumtetraphenylboron, tributylammoniumtetraphenylboron, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammonium tetrapentafluorophenylboron, N,N-diethylaniliniumtetraphenylboron, N,N-diethylaniliniumtetraphenylboron, N,N-diethylanilinium tetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetraphenylaluminum, N,N-diethylaniliniumtetrapentafluorophenylaluminum, diethylammonium tetrapentafluorophenylaluminum, triphenylphosphoniumtetraphenylaluminum, trimethylphosphoniumtetraphenylaluminum, triethylammoniumtetraphenylboron, tri butylammoniumtetraphenylboron, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl) boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammonium tetrapentafluorophenylboron, triphenylphosphoniumtetraphenylboron, triphenylcarboniumtetraphenylboron, triphenylcarboniumtetraphenylaluminum, triphenylcarboniumtetra(p-trifluoromethylphenyl)boron, triphenylcarbonium tetrapentafluorophenylboron, and so forth.

As seen in Scheme 2 and Scheme 3, for the second metallocene compound to be supported effectively, the second metallocene compound should have a functional group (Lewis base) containing one or more group XV or group XVI hetero atoms such as oxygen, sulfur, nitrogen and phosphorus, in cyclopentadiene, the cyclopentadiene derivative or the bridge group. And, it should be a compound capable of inducing higher molecular weight than the first metallocene compound.

The second metallocene compound having a bridge linkage containing at least one Lewis base in cyclopentadiene, the cyclopentadiene derivative or the bridge group is a compound represented by the following Chemical Formula 2 or Chemical Formula 3. It induces high molecular weight polyolefin during olefin polymerization.

Chemical Formula 2

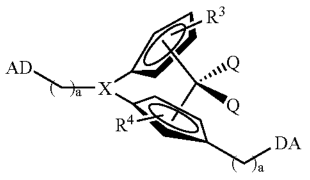

Chemical Formula 3

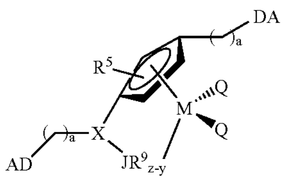

Here,

M is a group IV transition metal;

each of $(C_5R^3)$, $(C_5R^4)$ and $(C_5R^5)$ is a cyclopentadienyl; a cyclopentadienyl wherein two neighboring carbon atoms of $C_5$ are connected by a hydrocarbyl radical to form one or more $C_4$ to $C_{16}$ ring; or a substituted cyclopentadienyl ligand;

each of $R^3$, $R^4$, and $R^5$ is identical or different and a substituent selected from hydrogen radical, $C_1$ to $C_{40}$ alkyl, cycloalkyl, aryl, alkenyl, alkylaryl, arylalkyl, or arylalkenyl radical; and at least one hydrogen radical comprised in the substituent of $R^3$, $R^4$, and $R^5$ is further substituted by a radical represented by the following Chemical Formula a, the following Chemical Formula b, the following Chemical Formula c, or the following Chemical Formula d;

each Q is identical or different halogen radical; $C_1$ to $C_{20}$ alkyl radical, alkenyl radical, aryl radical, alkylaryl radical, arylalkyl radical; or $C_1$ to $C_{20}$ alkylidene radical;

X is a bridge for binding two cyclopentadienyl ligands or a cyclopentadienyl ligand and $JR^9_{z-y}$ by a covalent bond, which is a radical having the formula of $C_mH_{2m-1}$, monoalkyl silicon, monoalkyl germanium, phosphine, or amine, wherein m is an integer of 1 to 4;

$R^9$ is a hydrogen radical, a $C_1$ to $C_{20}$ alkyl radical, an alkenyl radical, an aryl radical, an alkylaryl radical or an arylalkyl radical;

J is a group XV element or a group XVI element;

D is an oxygen or amine;

A is a hydrogen radical, a $C_1$ to $C_{20}$ alkyl radical, an alkenyl radical, an aryl radical, an alkylaryl radical, an arylalkyl radical, an alkylsilyl radical, an arylsilyl radical, methoxymethyl, t-butoxymethyl, tetrahydropyranyl, tetrahydrofuranyl, 1-ethoxyethyl, 1-methyl-1-methoxyethyl or t-butyl; and a is an integer of 4 to 8:

Chemical Formula d

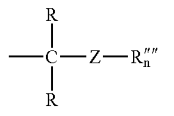

Here,

Z is an oxygen, sulfur, nitrogen, phosphorus or arsenic atom;

each of R is identical or different hydrogen radical, $C_1$ to $C_{40}$ alkyl, cycloalkyl, aryl, alkenyl, alkylaryl, arylalkyl or arylalkenyl radical;

R"" is a hydrogen radical or $C_1$ to $C_{40}$ alkyl, aryl, alkenyl, alkylaryl, alkylsilyl, arylsilyl, phenyl or substituted phenyl; and n is 1 or 2, where if Z is oxygen or sulfur n is 1, and if Z is nitrogen, phosphorus or arsenic n is 2.

A typical example of the second metallocene compound of the present invention is $[(A—D—(CH_2)_a)(CH_3)X(C_5H_4)(9\text{-}C_{13}H_9)]ZrCl_2$ or $[(A—D—(CH_2)_a)](CH_3)X(C_5Me_4)(NCMe_3)]TiCl_2$. Preferably, a is an integer of 4 to 8, X is CH, $C_2H_3$, or silicon, D is an oxygen or amine, and A is selected from a group consisting of hydrogen, $C_1$ to $C_{20}$ alkyl, alkenyl, aryl, alkylaryl, arylalkyl, alkylsilyl, arylsilyl, methoxymethyl, t-butoxymethyl, tetrahydropyranyl, tetrahydrofuranyl, 1-ethoxyethyl, 1-methyl-1-methoxyethyl or t-butyl.

Typical but non-restrictive molecular structures of the second metallocene compound of the present invention are as follows:

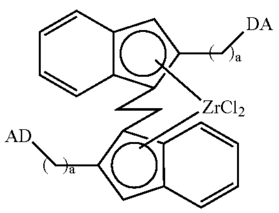

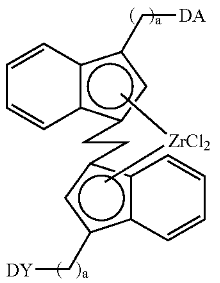

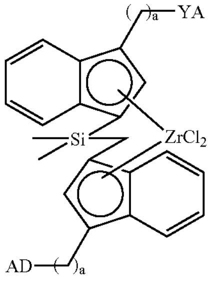

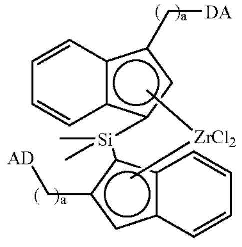

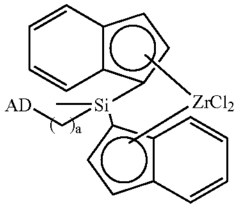

-continued

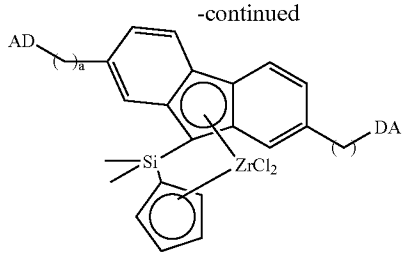

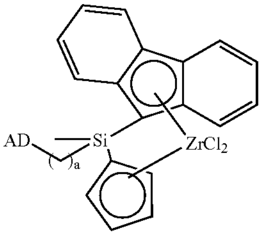

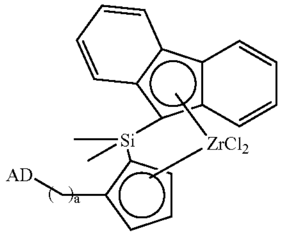

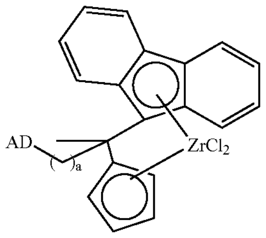

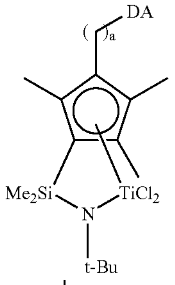

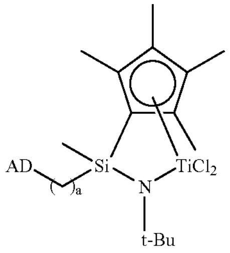

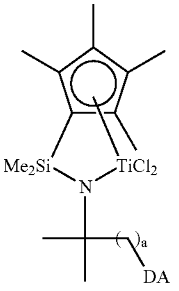

Here, definitions of D, A and a are the same as those in Chemical Formula 2 and Chemical Formula 3.

The group IV metal content of the finally obtained supported hybrid metallocene catalyst of the present invention is 0.1 to 20 wt %, preferably 0.1 to 10 wt %, and more preferably 1 to 3 wt %.

The molar ratio of [group XIII metal]/[group IV metal] of the supported hybrid metallocene catalyst is 1 to 10,000, preferably 1 to 1,000, and more preferably 10 to 100.

The molar ratio of the second metallocene compound to the first metallocene compound is recommended to be 0.01 to 100 for better control of the molecular weight distribution of the target polyolefin (Mw/Mn=3 to 50).

The supported hybrid metallocene catalyst of the present invention can be used for olefin polymerization without any treatment. Also, it can be prepared into a pre-polymerized catalyst by contacting the hybrid catalyst with an olefinic monomer such as ethylene, propylene, 1-butene, 1-hexene and 1-octene.

For the polymerization process using the supported hybrid metallocene catalyst of the present invention, a solution process, a slurry process, a gas phase process or a combination of slurry and gas phase processes can be applied. A slurry process or a gas phase is preferable, and a slurry process or a gas phase using a single reactor is more preferable.

The supported hybrid metallocene catalyst of the present invention can be used in an olefin polymerization process after diluted into a slurry using an appropriate $C_5$ to $C_{12}$ aliphatic hydrocarbon solvent, such as pentane, hexane, heptane, nonane, decane and isomers thereof, an aromatic hydrocarbon solvent such as toluene and benzene, or a hydrocarbon solvent substituted by a chlorine atom, such as dichloromethane and chlorobenzene. Preferably, the solvent is treated with a trace of aluminum to remove catalytic poisons like water, air, and so forth.

Olefinic monomers such as ethylene, propylene, α-olefin and cyclic olefin can be polymerized using the supported hybrid metallocene catalyst of the present invention. Also, dienic olefinic monomers or trienic olefinic monomers having two or more double bonds can be polymerized. Examples of such monomers are ethylene, propylene, 1-butene, 1-pentene, 4-methyl-1-pentene, 1-hexene, 1-heptene, 1-decene, 1-undecene, 1-dodecene, 1-tetradecene, 1-hexadecene, 1-icosene, norbornene, norbornadiene, ethylidenenorbornene, vinylnorbornene, dicyclopentadiene, 1,4-butadiene, 1,5-pentadiene, 1,6-hexadiene, styrene, α-methylstyrene, divinylbenzene and 3-chloromethylstyrene. These monomers can also be polymerized in combination.

The temperature for polymerizing these monomers using the supported hybrid metallocene catalyst of the present invention is 25 to 500° C., preferably 25 to 200° C., and more preferably 50 to 100° C. And, the polymerization pressure is 1 to 100 $Kgf/cm^2$, preferably 1 to 50 $Kgf/cm^2$, and more preferably 5 to 15 $Kgf/cm^2$.

With the supported hybrid metallocene catalyst of the present invention, which is obtained by supporting two or more different metallocenic transition compound catalysts capable of polymerizing polyolefins with different molecular weights on a metal oxide support such as silica, the physical properties and molecular weight distribution of polyolefin can be easily controlled. A polyolefin prepared using the supported hybrid metallocene catalyst has a variety of physical properties and molecular weight distribution, and can be molded into various products, including rotation molded products, injection molded products, films, containers, pipes and fibers.

Hereinafter, the present invention is described in more detail through Examples and Comparative Examples. However, the following Examples are only for the understanding of the present invention, and the present invention is not limited by the following Examples.

EXAMPLES

Organic reagents and solvents for catalyst preparation and polymerization were purchased from Aldrich and purified by the standard methods. Ethylene (high purity) was purchased from Applied Gas Technology and filtered to remove moisture and oxygen before polymerization. Catalyst preparation, supporting and polymerization were carried out isolated from air and moisture to ensure reproducibility.

A 300 MHz NMR (Bruker) spectrum was obtained to identify the catalyst structure.

The apparent density was determined with Apparent Density Tester 1132 (APT Institute fr Prftechnik) according to DIN 53466 and ISO R 60.

The molecular weight and molecular weight distribution were determined from the GPC (gel permeation chromatography) analysis using Waters' 150 CV+. The analysis temperature was 140° C. Trichlorobenzene was used as a solvent, and the number-average molecular weight ($M_n$) and weight-average molecular weight ($M_w$) were determined after standardizing with polystyrene. The molecular weight distribution (polydispersity index, PDI) was calculated by dividing the weight-average molecular weight by the number-average molecular weight.

The polymer's melt index (MI) was determined by ASTM D-1238 (Condition: E, F, 190° C.). $I_2$ is the value determined at Condition E, and $I_{21}$ is the value determined at Condition F. $I_5$ is an MI determined at a load of 5 Kg with other conditions the same. The polymer's density was determined by ASTM D-1505-68.

Preparation Example 1

Preparation of the First Metallocene Catalyst—Synthesis of $[Me_3SiO—(CH_2)_6—C_5H_4]_2ZrCl_2$ 50 mL of pyridine was added to a flask containing 9.74 g of 1,6-hexanediol and 15.7 g of p-toluenesulfonyl chloride. The flask was put in a refrigerator and let alone for a day. 500 mL of 2 N HCl was added to the flask and extraction was carried out using 100 mL of diethyl ether. A small amount of moisture dissolved in ether was removed with anhydrous $MgSO_4$. After filtration, the ether was removed by distillation under reduced pressure. From a column chromatography using silica gel and a diethyl ether solvent, 9.00 g of a compound with only one hydroxyl group tosylated was obtained (yield: 40%).

100 mL of anhydrous THF was added to 8.12 g of the compound. Then, 45 mL of 2 N sodium cyclopentadiene (NaCp) was added in an ice bath. Three hours later, 200 mL of water was added and extraction was carried out using 100 mL of hexane. From a column chromatography using silica gel and hexane and diethyl ether (v/v=1:1), 4.07 g of a 6-(hydroxy)hexylcyclopentadiene compound was obtained (yield: 82%).

17.9 mmol of this compound was dissolved in 25 mL of THF. Then, 2.7 mL of chlorotrimethylsilane and 3.00 mL of triethylamine were added sequentially. All volatile materials were removed at vacuum and filtration was carried out using hexane. After removing the hexane by distillation under reduced pressure, distillation under reduced pressure (78° C./0.2 torr) was carried out to obtain 3.37 g of a cyclopentadiene compound having a trimethylsilyl protected hydroxyl group, which is one of the first metallocene catalyst (yield: 79%). Its structure was analyzed by $^1H$ NMR.

$^1H$ NMR (300 MHz, $CDCl_3$): 6.5-5.9 (m, 3H), 3.55 (t, 2H), 2.92 (s, 1H), 2.85 (s, 1H), 2.33 (quintet, 2H), 1.6-1.2 (m, 8H), 0.09 (s, 9H).

11.4 mmol of this compound was dissolved in 20 mL of THF. Then, 1.22 g of solid lithium diisopropylamide was added at −78° C. without contact with air. After slowly heating to room temperature, stirring was carried out for two hours. All volatile materials were removed with a vacuum pump, and then 20 mL of THF was added. After adding 2.15 g of $ZrCl_4(THF)_2$, stirring was carried out for 40 hours at 60° C. All volatile materials were removed with a vacuum pump, and extraction was carried out using a mixture solvent of toluene and hexane. Then, 2.0 mL of chlorotrimethylsilane was added. After letting alone at room temperature for one hour, the compound was put in a refrigerator to obtain a white solid (yield: 70%).

$^1H$ NMR (300 MHz, $CDCl_3$): 6.34 (s, 2H), 6.25 (s, 2H), 3.62 (t, 2H), 2.68 (t, 2H), 1.6-1.2 (m, 8H), 0.17 (s, 9H).

Preparation Example 2

Preparation of the First Metallocene Catalyst—Synthesis of $[t\text{-}Bu—O—(CH_2)_6—C_5H_4]_2ZrCl_2$ t-Butyl-O—$(CH_2)_6$—Cl was prepared using 6-chlorohexanol according to the method reported in literature (*Tetrahedron Lett.* 2951 (1988)). NaCp was reacted with the compound as in Preparation Example 1 to obtain t-butyl-O—$(CH_2)_6$—$C_5H_5$ (yield: 60%, b.p. 80° C./0.1 mmHg). Zirconium was attached by the same method to obtain another compound, which is also one of the target catalysts (yield: 92%).

$^1H$ NMR (300 MHz, $CDCl_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H); $^{13}C$ NMR ($CDCl_3$): 135.09, 116.66, 112.28, 72.42, 61.52, 30.66, 30.61, 30.14, 29.18, 27.58, 26.00.

Preparation Example 3

Preparation of the Second Metallocene Catalyst—Synthesis of $t\text{-}Bu—O—(CH_2)_6)(CH_3)Si(C_5H_4)(9\text{-}C_{13}H_9)ZrCl_2$ A t-Bu—O—$(CH_2)_6$Cl compound and Mg(O) were reacted in a diethyl ether ($Et_2O$) solvent to obtain 0.14 mol of a t-Bu—O—$(CH_2)_6$MgCl solution, which is a Grignard reagent. Then, a $MeSiCl_3$ compound (24.7 mL, 0.21 mol) was added at −100° C. String was carried out for over 3 hours at room temperature. Then, the solution was filtered and dried at vacuum to obtain a t-Bu—O—$(CH_2)_6SiMeCl_2$ compound (yield: 84%).

A fluorenyllithium (4.82 g, 0.028 mol)/hexane (150 mL) solution was slowly added for 2 hours to a t-Bu—O—$(CH_2)_6SiMeCl_2$ (7.7 g, 0.028 mol) solution dissolved in hexane (50 mL) at −78° C. A white precipitate (LiCl) was filtered out, and extraction was carried out using hexane. All volatile materials were removed by vacuum drying to obtain a pale yellow oily (t-Bu—O—$(CH_2)_6$)SiMe(9-$C_{13}H_{10}$) compound (yield: 99%).

A THF solvent (50 mL) was added, and a reaction with a $C_5H_5Li$ (2.0 g, 0.028 mol)/THF (50 mL) solution was carried out at room temperature for over 3 hours. All volatile materials were removed by vacuum drying and extraction was carried out using hexane to obtain an orange oily (t-Bu—O—$(CH_2)_6$)($CH_3$)Si($C_5H_5$)(9-$C_{13}H_{10}$) compound, which is the target ligand (yield: 95%). The structure of the ligand was identified by $^1H$ NMR.

$^1H$ NMR (400 MHz, $CDCl_3$): 1.17, 1.15 (t-BuO, 9H, s), −0.15, −0.36 (MeSi, 3H, s), 0.35, 0.27 ($CH_2$, 2H, m), 0.60, 0.70 ($CH_2$, 2H, m), 1.40, 1.26 ($CH_2$, 4H, m), 1.16, 1.12 ($CH_2$, 2H, m), 3.26 (t-BuO$CH_2$, 2H, t, 3JH-H=7 Hz), 2.68 (methylene CpH, 2H, brs), 6.60, 6.52, 6.10 (CpH, 3H, brs), 4.10, 4.00 (FluH, 1H, s), 7.86 (FluH, 2H, m), 7.78 (FluH, 1H, m), 7.53 (FluH, 1H, m), 7.43-7.22 (FluH, 4H, m)

Two equivalents of n-BuLi was added to a (t-Bu—O—$(CH_2)_6$)($CH_3$)Si($C_5H_5$) (9-$C_{13}H_{10}$) (12 g, 0.028 mol)/THF (100 mol) solution at −78° C. Heating to room temperature, a reaction was carried out for over 4 hours to obtain an orange solid (t-Bu—O—$(CH_2)_6$)($CH_3$)Si($C_5H_5Li$)(9-$C_{13}H_{10}Li$) compound (yield: 81%).

A dilithium salt (2.0 g, 4.5 mmol)/ether (30 mL) solution was slowly added to a $ZrCl_4$ (1.05 g, 4.50 mmol)/ether (30 mL) suspension at −78° C. A reaction was carried out for 3 hours at room temperature. All volatile materials were removed by vacuum drying, and the resultant oily liquid was filtered by adding a dichloromethane solvent. The filtered solution was vacuum dried, and hexane was added to induce precipitation. The resultant precipitate washed several times with hexane to obtain a red solid racemic-(t-Bu—O—$(CH_2)_6)(CH_3)Si(C_5H_4)(9\text{-}C_{13}H_9)ZrCl_2$ compound (yield: 54%).

$^1H$ NMR (400 MHz, $CDCl_3$): 1.19 (t-BuO, 9H, s), 1.13 (MeSi, 3H, s), 1.79 ($CH_2$, 4H, m), 1.60 ($CH_2$, 4H, m), 1.48 ($CH_2$, 2H, m), 3.35 (t-Bu$OCH_2$, 2H, t, 3JH-H=7 Hz), 6.61 (CpH, 2H, t, 3JH-H=3 Hz), 5.76 (CpH, 2H, d, 3JH-H=3 Hz), 8.13 (FluH, 1H, m), 7.83 (FluH, 1H, m), 7.78 (FluH, 1H, m), 7.65 (FluH, 1H, m), 7.54 (FluH, 1H, m), 7.30 (FluH, 2H, m), 7.06 (FluH, 1H, m)

$^{13}C$ NMR (400 MHz, $CDCl_3$): 27.5 ($Me_3CO$, q, 1JC-H=124 Hz), −3.3 (MeSi, q, 1JC-H=121 Hz), 64.6, 66.7, 72.4, 103.3, 127.6, 128.4, 129.0 (7C, s), 61.4 ($Me_3COCH_2$, t, 1JC-H=135 Hz), 14.5 (ipso-$SiCH_2$, t, 1JC-H=122 Hz), 33.1, 30.4, 25.9, 22.7 (4C, t, 1JC-H=119 Hz), 110.7, 111.4, 125.0, 125.1, 128.8, 128.1, 126.5, 125.9, 125.3, 125.1, 125.0, 123.8 (FluC and CpC, 12C, d, 1JC-H=171 Hz, 3JC-H=10 Hz)

Preparation Example 4

Preparation of the Second Metallocene Catalyst—Synthesis of $(CH_3)_2Si$(t-Bu—O—$(CH_2)_6$—$(C_5H_4)(9\text{-}C_{13}H_9)ZrCl_2$ A $Me_2SiCl(9\text{-}C_{13}H_{10})$ compound was obtained from a reaction of fluorenyllithium and $Me_2SiCl_2$ in hexane. After adding a t-Bu—O—$(CH_2)_6$—$C_5H_5Li$ (0.016 mol; obtained from a reaction of t-Bu—O—$(CH_2)_6$—$C_5H_5$ and n-BuLi in THF) solution to a $Me_2SiCl(9\text{-}C_{13}H_{10})$ solution dissolved in a THF solvent (50 mL) at room temperature, the reaction temperature was slowly increased to room temperature. The mixture was reacted for over 3 hours at room temperature, and all volatile materials were removed by vacuum drying. Hexane was added to the resultant oily liquid. The hexane solution was filtered and vacuum dried to obtain a pale yellow oily (($(CH_3)_2Si$(t-Bu—O—$(CH_2)_6$—$(C_5H_5)(9\text{-}C_{13}H_{10})$) ligand (yield: 99%). The structure of the ligand was identified by $^1H$ NMR.

$^1H$ NMR (400 MHz, $C_6D_6$): 1.09 (t-BuO, 9H, s), −0.13, −0.32, −0.61 ($Me_2Si$, 6H, s), 1.25 ($CH_2$, 2H, m), 1.24 ($CH_2$, 2H, m), 1.41 ($CH_2$, 4H, m), 2.25 (Cp-$CH_2$, 2H, m), 3.23 (t-Bu$OCH_2$, 2H, d of t, 3JH-H=7 Hz), 6.35, 6.05, 5.70 (CpH, 5H, m, m, brs), 3.05 (methylene CpH, 2H, brs), 4.20, 4.00, 3.85 (FluH, 1H, s), 7.80 (FluH, 2H, m), 7.45 (FluH, 2H, m), 7.29-7.20 (FluH, 4H, m).

From a reaction of a dilithium salt and a $ZrCl_4$ compound, an orange solid racemic-$(CH_3)_2Si$(t-Bu—O—$(CH_2)_6$—$(C_5H_4)(9\text{-}C_{13}H_9)ZrCl_2$ compound, as in Preparation Example 3 (yield: 25%).

$^1H$ NMR (400 MHz, $CDCl_3$): 1.16 (t-BuO, 9H, s), 1.11 ($Me_2Si$, 3H, s), 1.13 ($Me_2Si$, 3H, s), 1.43 ($CH_2$, 4H, m), 1.25 ($CH_2$, 4H, m), 2.45 (Cp-$CH_2$, 2H, m), 3.26 (t-Bu$OCH_2$, 2H, t, 3JH-H=7 Hz), 5.41 (CpH, 1H, t, 3JH-H=3 Hz), 5.70 (CpH, 1H, t, 3JH-H=3 Hz), 6.28 (CpH, 1H, t, 3JH-H=3 Hz), 8.13 (FluH, 2H, m), 7.67-7.49 (FluH, 4H, m), 7.29 (FluH, 2H, m).

$^{13}C$ NMR (400 MHz, $CDCl_3$): 27.5 ($Me_3CO$, q, 1JC-H=125 Hz), −3.3 ($Me_2Si$, q, 1JC-H=121 Hz), 27.6, 66.3, 72.4, 102.6, 113.8, 128.8, 129.1, 141.9 (9C, s), 61.5 ($Me_3COCH_2$, t, 1JC-H=141 Hz), 30.5, 30.2, 30.0, 29.2, 25.9 (5C, t, 1JC-H=124 Hz), 111.6, 112.0, 119.7, 123.8, 123.9, 125.0, 126.3, 126.5, 128.0, 128.1, 128.7 (FluC and CpC, 11C d, 1JC-H=161 Hz, 3JC-H=10 Hz)

Preparation Example 5

Preparation of the Second Metallocene Catalyst—Synthesis of (t-Bu—O—$(CH_2)_6)(CH_3)C(C_5H_4)(9\text{-}C_{13}H_9)ZrCl_2$ Pyrrolidine (12.5 mL, 0.15 mol) was added to a mixture of 8-butoxy-2-octanone (13.5 g, 0.067 mol) and cyclopentadiene monomer (9.0 g, 0.14 mol) in an anhydrous methanol solvent (200 mL) at room temperature. A reaction was carried out for 12 hours. An acetic acid (12 g, 0.2 mol)/water (200 mL) solution was added to the reaction solution. After stirring for an hour, the organic layer was extracted with an ether solvent (300 mL). The resultant liquid was distilled under reduced pressure (100° C., 500 mtorr) to obtain a pale yellow oily 6-methyl-6-t-butoxyhexylfulvene(6-methyl-6-t-buthoxyhexylfulvene) compound (yield: 40%).

A fluorenyllithium (4.48 g, 0.026 mol)/THF (100 mL) solution was slowly added to a 6-methyl-6-t-butoxyhexylfulvene (6.5 g, 0.026 mol) solution dissolved in a THF solvent (50 mL) at −78° C. Stirring was carried out for 12 hours at room temperature. A saturated $NH_4Cl$/water solution and an ether solvent were added to the reaction solution to extract the organic layer. From a chromatography, a yellow oily (t-Bu—O—$(CH_2)_6)(CH_3)C(C_5H_5)(9\text{-}C_{13}H_{10})$ ligand was obtained (yield: 97%).

$^1H$ NMR (400 MHz, $CDCl_3$): 1.19 (t-BuO, 9H, s), 0.58, 0.89 (MeC, 3H, s), 1.90 ($CH_2$, 2H, m), 1.49 ($CH_2$, 2H, m), 1.30 ($CH_2$, 4H, m), 1.27 ($CH_2$, 2H, m), 3.31 (t-Bu$OCH_2$, 2H, t, 3JH-H=7 Hz), 6.88, 6.62, 5.87 (CpH, 3H, brs), 3.07 (methylene CpH, 2H, brs), 4.15 (FluH, 1H, s), 7.72 (FluH, 1H, m), 7.67 (FluH, 1H, m), 7.55 (FluH, 1H, m), 7.36 (FluH, 1H, m), 7.28 (FluH, 1H, m), 7.24 (FluH, 1H, m), 7.04 (FluH, 1H, m), 6.76 (FluH, 1H, m)

Two equivalents of n-BuLi (1.6 M in hexane) was added to a (t-Bu—O—$(CH_2)_6)(CH_3)C(C_5H_5)(9\text{-}C_{13}H_{10})$ (3.2 g, 0.008 mol)/THF (50 mL) solution at −78° C. Stirring was carried out for 5 hours at room temperature to obtain a red solid (t-Bu—O—$(CH_2)_6)(CH_3)C(C_5H_4Li)(9\text{-}C_{13}H_9Li)$ compound (yield: 88%).

A dilithium salt (2.5 g, 4.4 mmol)/hexane (50 mL) solution was slowly added to a $ZrCl_4$ (1.02 g, 4.5 mmol)/hexane (50 mL) suspension at −78° C., and stirring was carried out for 12 hours at room temperature. All volatile materials were removed by vacuum drying. After extracting with a toluene (100 mL) solvent and washing several times with hexane, a red solid racemic-(t-Bu—O—$(CH_2)_6)(CH_3)C(C_5H_4)(9\text{-}C_{13}H_9)ZrCl_2$ compound was obtained (yield: 31%).

$^1H$ NMR (400 MHz, $CDCl_3$): 1.18 (t-BuO, 9H, s), 2.39 (MeC, 3H, s), 1.82 ($CH_2$, 2H, m), 1.59 ($CH_2$, 4H, m), 1.46 ($CH_2$, 2H, m), 1.22 ($CH_2$, 2H, m), 3.34 (t-Bu$OCH_2$, 2H, t, 3JH-H=7 Hz), 6.33 (CpH, 2H, t, 3JH-H=2 Hz), 5.80-5.75 (CpH, 2H, m), 7.27 (FluH, 2H, m), 7.56 (FluH, 2H, m), 7.63 (FluH, 1H, d, 3JH-H=9 Hz), 7.82 (FluH, 1H, d, 3JH-H=9 Hz), 8.14 (FluH, 2H, m).

$^{13}C$ NMR (400 MHz, $CDCl_3$): 27.5 ($Me_3CO$, q, 1JC-H=124 Hz), −3.3 (MeSi, q, 1JC-H=121 Hz), 64.6, 66.7, 72.4, 103.3, 127.6, 128.4, 129.0 (7C, s), 61.4 ($Me_3COCH_2$, t, 1JC-H=135 Hz), 14.5 (ipso-$SiCH_2$, t, 1JC-H=122 Hz), 33.1, 30.4, 25.9, 22.7 (4C, t, 1JC-H=119 Hz), 110.7, 111.4, 125.0, 125.1, 128.8, 128.1, 126.5, 125.9, 125.3, 125.1, 125.0, 123.8 (FluC and CpC, 12C, d, 1JC-H=171 Hz, 3JH-H=10 Hz)

Preparation Example 6

Preparation of the Second Metallocene Catalyst—Synthesis of $(CH_3)_2C$(t-Bu—O—$(CH_2)_6$—$(C_5H_4)$(9-$C_{13}H_9$)$ZrCl_2$ A 6,6-dimethyl-3-(6-t-butoxyhexyl)fulvene compound was obtained using t-butoxyhexylcyclopentadiene and anhydrous acetone, as in Preparation Example 5 (yield: 59%). A fluorenyllithium compound was used to obtain a yellow oily $(CH_3)_2C$(t-Bu—O—$(CH_2)_6$—$(C_5H_5)$(9-$C_{13}H_{10}$) ligand (yield: 70%).

$^1H$ NMR (400 MHz, $CDCl_3$): 1.19, 1.20 (t-BuO, 9H, s), 1.06, 1.05, 1.02 ($Me_2C$, 6H, s), 1.27 ($CH_2$, 2H, m), 1.41 ($CH_2$, 2H, m), 1.58 ($CH_2$, 4H, m), 2.50, 2.46, 2.36 (Cp-$CH_2$, 2H, t, 3JH-H=7 Hz), 3.36 (t-BuO$CH_2$, 2H, d of t, 3JH-H=7 Hz), 6.53, 6.10, 6.00, 5.97, 5.69 (CpH, 5H, brs), 3.07 (methylene-CpH, 2H, brs), 4.14, 4.11, 4.10 (FluH, 1H, s), 7.70 (FluH, 2H, m), 7.33 (FluH, 2H, m), 7.23-7.10 (FluH, 4H, m).

From a reaction of a dilithium salt and a $ZrCl_4$ compound as in Preparation Example 5, an orange solid racemic-$(CH_3)_2C$(t-Bu—O—$(CH_2)_6$—$(C_5H_4)$(9-$C_{13}H_9$)$ZrCl_2$ compound was obtained (yield: 63%).

$^1H$ NMR (400 MHz, $CDCl_3$): 1.16 (t-BuO, 9H, s), 2.35 ($Me_2C$, 3H, s), 2.40 ($Me_2C$, 3H, s) 1.46 ($CH_2$, 4H, m), 1.27 ($CH_2$, 4H, m), 1.20 ($CH_2$, 2H, m), 2.52 (Cp-$CH_2$, 2H, m), 3.27 (t-BuO$CH_2$, 2H, t, 3JH-H=7 Hz), 5.43 (CpH, 1H, t, 3JH-H=3 Hz), 5.67 (CpH, 1H, t, 3JH-H=3 Hz), 6.01 (CpH, 1H, t, 3JH-H=3 Hz), 8.15 (FluH, 2H, m), 7.80 (FluH, 2H, m), 7.54 (FluH, 2H, m), 7.26 (FluH, 2H, m)

$^{13}C$ NMR (400 MHz, $CDCl_3$): 27.5 ($Me_3CO$, q, 1JC-H=124 Hz), 15.3 ($Me_2C$, q, 1JC-H=124 Hz), 40.4 ($Me_3C$, s), 25.9 ($Me_2C$, s), 68.1, 72.4, 78.8, 113.8, 122.6, 136.4, 142.0 (7C, s), 61.5 ($Me_3COCH_2$, t, 1JC-H=140 Hz), 65.8 (Cp$CH_2$, t, 1JC-H=138 Hz), 30.5, 29.7, 29.2, 27.6 (4C, t, 1JC-H=124 Hz), 103.0, 103.1, 117.2, 128.9, 128.2, 125.3, 124.9, 124.8, 123.4, 123.2, 123.1 (FluC and CpC, 11C d, 1JC-H=171 Hz, 3JC-H=10 Hz)

Preparation Example 7

Preparation of the Second Metallocene Catalyst—Synthesis of $[(CH_3)_2Si(^iPr_2$—N-Et-$(C_5H_4))$(9-$C_{13}H_9$)]$ZrCl_2$ A $[(CH_3)_2Si(^iPr_2$—N(Et)$(C_5H_4))$(9-$C_{13}H_9$)]$ZrCl_2$ compound having an amine group in cyclopentadiene was prepared by the method presented in literature (*Angew. Chem. Int Ed.,* 39, 2000, 789).

Examples 1 to 11

Preparation of Supported Hybrid Catalyst

Drying of Support

Silica (XPO 2412, Grace Davison) was dehydrated for 15 hours at 800° C. in vacuum.

Preparation of the First Supported Catalyst 1.0 g of the silica was put in a glass reactor. After adding 10 mL of hexane, 10 mL of each hexane solution dissolving 50, 100 and 200 mg of the first metallocene compound prepared in Preparation Examples 1 and 2 was added. Then, a reaction was carried out for 4 hours at 90° C. while stirring the reactor. After the reaction was completed, the hexane was removed by layer separation. After washing three times with 20 mL of a hexane solution, the hexane was removed by suction to obtain a solid powder.

Preparation of the Second Supported Catalyst—Activation of the First Supported Catalyst A methylaluminoxane (MAO) solution containing 12 mmol of aluminum in a toluene solution was added to the first supported catalyst. A reaction was carried out at 40° C. while stirring. The unreacted aluminum compound was removed by washing a sufficient amount of toluene. Then, the remaining toluene was removed by suction at 50° C. The resultant solid can be used as a catalyst for olefin polymerization without further treatment.

Preparation of Supported Hybrid Catalyst

A toluene solution, dissolving 50, 100 and 200 mg of each second metallocene compound prepared in Preparation Examples 3 to 7 respectively, was added to the second supported catalyst in a glass reactor. A reaction was carried out at 40° C. while stirring the reactor. After washing with a sufficient amount of toluene, drying was carried out to obtain a solid powder.

The resultant supported hybrid catalyst can be used as a catalyst without further treatment. Or, 30 psig of ethylene may be added for 2 minutes and a pre-polymerization can be carried out for an hour room temperature. To prove that the supported catalyst has a superior properties, such pre-polymerization was not carried out. The powder was vacuum dried to obtain a solid catalyst.

Comparative Examples 1 to 3

A first supported catalyst, on which only the first metallocene catalyst of Preparation Example 1 and Preparation Example 2 was supported (see Table 1), was prepared by the method for preparing the first supported catalyst of Examples 1 to 11 (see FIG. 2).

Comparative Example 4

A first supported catalyst, on which only the second metallocene compound of Preparation Example 3 was supported (see Table 1), was prepared by the method for preparing the first supported catalyst of Examples 1 to 11.

Example 12

Semibatch Ethylene Polymerization 50 mg of each supported catalyst prepared in Examples 1 to 11 and Comparative Examples 1 to 4 was weighed in a dry box and put in a 50 mL glass bottle. The bottle was sealed with a rubber diaphragm and taken out of the dry box, and a catalyst was ready for injection. The polymerization was performed in a 2 L metal alloy reactor for high pressure, equipped with a mechanical stirrer and capable of temperature control.

1 L of hexane dissolving 1.0 mmol of triethylaluminum and the prepared supported catalyst were added to the reactor without contact with air. The polymerization was carried out for an hour at 80° C., continuously applying a gaseous ethylene monomer at a pressure of 9 Kgf/$cm^2$. The polymerization was terminated by stopping the stirring and exhausting the ethylene.

The resultant polymer was filtered through a polymerization solvent and dried in an 80° C. vacuum oven for 4 hours.

The ethylene polymerization activity, melt index of the polymer, apparent density, molecular weight and molecular weight distribution for each prepared catalyst are shown in Table 2 below.

In ethylene polymerization using the supported catalysts of the present invention, there was no fouling, or sticking of polymer particles to the reactor wall or one another. Also, the apparent density was superior (0.34 to 0.45 g/cc). In addition, the weight-average molecular weight ($M_w$) could be controlled in the range of 180,000 to 600,000, and the molecular weight distribution could be controlled in a wide range of 2.5 to 11. The obtained polymer had a good shape (see FIG. 1).

Comparative Example 5

A first supported catalyst was prepared using bis(octylcyclopentadienyl) zirconium dichloride disclosed in U.S. Pat. No. 5,324,800, which has no functional group that can react with silica, by the method of Examples 1 to 11. The polymerization was carried out after a pre-polymerization.

50 mg of the supported catalyst was taken, and the polymerization was performed as in Example 12. The yield was 120 g. During the pre-polymerization and the polymerization, there occurred a severe fouling. The resultant particles had poor shape, and the apparent density was only 0.04 g/mL.

Comparative Example 6

A [2-ethoxyethyl-O—$(CH_2)_6$—$C_5H_4]_2ZrCl_2$ compound comprising only primary alkyls, so as to have a relatively high Lewis basicity and having as many as four oxygen atoms, so as to easily bind to an inorganic support by a Lewis acid-base reaction, but having a structure in which the carbon-oxygen bond is difficult to be broken, which is similar to the catalyst presented as an example in U.S. Pat. No. 5,814,574 and U.S. Pat. No. 5,767,209, was synthesized by the method presented in literature (*J. Organomet. Chem.*, 552, 1998 313). The supporting was carried out by the same method of Examples 1 to 11. The polymerization was carried out after a pre-polymerization.

50 mg of the supported catalyst was taken, and the polymerization was performed as in Example 12. The yield was only 50 g. During the pre-polymerization and the polymerization, there occurred a severe fouling. The particle shape could not be controlled, and the apparent density was only 0.08 g/mL.

Comparative Example 7

The following test was carried out to prove the strong interaction of the functional group of the second metallocene compound and a group XIII compound (aluminum and boron compound).

Silica (PO 2412, Grace Davison) was dehydrated at 800° C. for 15 hours in vacuum. 10 g of the silica was put in a glass reactor. After adding 50 mL of hexane, 30 mL of a hexane solution dissolving 2 g of [t-Bu—O—$(CH_2)_6$—$C_5H_4]_2ZrCl_2$, which is the first metallocene catalyst synthesized in Preparation Example 2, was added to the reactor. A reaction was carried out at 90° C. for 4 hours while stirring the reactor. After washing with a sufficient amount of hexane, drying was carried out. A methylaluminoxane solution containing 12 mmol of Al/g-silica was added and a reaction was carried out for an hour at 40° C.

An $^iPr(C_5H_4)(9\text{-}C_{13}H_9)ZrCl_2$ [isopropyl-(cyclopentadienyl) (fluorenyl)zirconium dichloride] compound with no functional group was supported on the second metallocene compound as in Examples 1 to 11 to obtain the target catalyst.

The obtained solid catalyst was slurry polymerized in a hexane solvent as in Example 12. The resultant polymer showed severe fouling and the polymerization activity was 180 g. Therefore, it can be seen that in case $^iPr(C_5H_4)(9\text{-}C_{13}H_9)ZrCl_2$ having no functional group was introduced as the second metallocene catalyst, there were no supporting effect at all.

As can be seen from above result, the catalyst system of the present invention has a functional group that can interact with the cocatalyst, so that there arises no problem such as fouling during slurry polymerization using a solvent like hexane, because the active ingredient of the catalyst is not leached from the support but tightly attached to the supported catalyst and therefore the polymer is maintained well.

TABLE 1

| | Classification | | | |
|---|---|---|---|---|
| | The first metallocene catalyst | Cocatalyst | The second metallocene catalyst | Supporting amount of the first/second metallocenes (g/g in g $SiO_2$) |
| Comparative Example 1 | Preparation Example 1 | — | — | 0.2/0.0 |
| Comparative Example 2 | Preparation Example 2 | — | — | 0.2/0.0 |
| Example 1 | Preparation Example 2 | MAO | Preparation Example 3 | 0.1/0.05 |
| Example 2 | Preparation Example 2 | MAO | Preparation Example 3 | 0.1/0.1 |
| Example 3 | Preparation Example 2 | MAO | Preparation Example 3 | 0.1/0.2 |
| Comparative Example 3 | Preparation Example 2 | — | — | 0.05/0.0 |
| Example 4 | Preparation Example 2 | MAO | Preparation Example 3 | 0.05/0.05 |
| Example 5 | Preparation Example 2 | MAO | Preparation Example 3 | 0.05/0.1 |
| Example 6 | Preparation Example 2 | MAO | Preparation Example 3 | 0.05/0.2 |
| Comparative Example 4 | — | — | Preparation Example 3 | 0.0/0.2 |
| Example 7 | Preparation Example 2 | MAO | Preparation Example 3 | 0.2/0.1 |
| Example 8 | Preparation Example 2 | MAO | Preparation Example 3 | 0.1/0.1 |
| Example 9 | Preparation Example 2 | MAO | Preparation Example 4 | 0.1/0.1 |
| Example 10 | Preparation Example 2 | MAO | Preparation Example 5 | 0.1/0.1 |
| Example 11 | Preparation Example 2 | MAO | Preparation Example 6 | 0.1/0.1 |
| Comparative Example 5 | Bis(octylcyclopentadienyl)zirconium dichloride | — | — | 0.2/0.0 |
| Comparative Example 6 | [2-ethoxyethyl-O—$(CH_2)_6$—$C_5H_4]_2ZrCl_2$ | — | — | 0.2/0.0 |
| Comparative Example 7 | Preparation Example 2 | MAO | $^iPr(C_5H_4)(9\text{-}C_{13}H_9)ZrCl_2$ | 0.2/0.1 |

TABLE 2

| | Classification | | | | | |
|---|---|---|---|---|---|---|
| | Activity (g) | Apparent density (g/cc) | $I_2$ (g/10 min) | $I_{21}/I_5$ | Mw ($\times10^3$) | DPI |
| Comparative Example 1 | 154 | 0.34 | 1.30 | 7.1 | 182 | 2.5 |
| Comparative Example 2 | 186 | 0.34 | 120 | 7.4 | 176 | 2.8 |
| Example 1 | 143 | 0.40 | 0.07 | 9.3 | 698 | 8.9 |
| Example 2 | 177 | 0.41 | 0.04 | 9.3 | 735 | 7.9 |
| Example 3 | 207 | 0.42 | 0.05 | 9.5 | 754 | 9.5 |
| Comparative Example 3 | 53 | 0.43 | 1.30 | 9.7 | 218 | 2.7 |
| Example 4 | 135 | 0.42 | 0.06 | 6.6 | 769 | 7.8 |
| Example 5 | 158 | 0.41 | 0.04 | 9.6 | 765 | 7.3 |
| Example 6 | 147 | 0.42 | 0.03 | 9.5 | 722 | 8.8 |
| Comparative Example 4 | 155 | 0.41 | 0.04 | 10.5 | 822 | 5.2 |
| Example 7 | 205 | 0.41 | 0.10 | 10.7 | 637 | 8.6 |
| Example 8 | 160 | 0.40 | 0.04 | 9.5 | 710 | 8.5 |
| Example 9 | 165 | 0.39 | 0.04 | 9.7 | 657 | 8.4 |
| Example 10 | 166 | 0.41 | 0.04 | 9.6 | 667 | 7.6 |
| Example 11 | 145 | 0.41 | 0.10 | 7.1 | 349 | 6.5 |
| Comparative Example 5 | 120 | 0.04 | 0.70 | 7.3 | 290 | 2.5 |
| Comparative Example 6 | 50 | 0.08 | 0.56 | 7.2 | 377 | 2.7 |
| Comparative Example 7 | 180 | 0.12 | 0.10 | 8.3 | 585 | 5.7 |

Examples 13 and 14

Copolymerization of Continuous Ethylene/α-Olefin 1 kg of the supported hybrid catalyst of Example 7 was synthesized. The synthesized catalyst was put in a sealed contained under nitrogen atmosphere, emulsified in 50 L of purified hexane, and put inside a 100 L stirring tank reactor. The stirring tank reactor was run at 200 rpm. The polymerization was carried out in a 200 L continuous stirring tank reactor for high pressure which is equipped with a mechanical stirrer, capable of temperature control and continuously stirrable at 250 rpm. The polymer slurry leaving the reactor was passed through a centrifuge and a drier to obtain a solid powder. Ethylene was fed at a rate of 10 to 15 kg/hr at 80° C. The catalyst injection amount was controlled so that the ethylene pressure remains at 8 to 9 kgf/cm$^2$. Each 10 mL of the catalyst was injected at time intervals. The polymerization time was controlled by the solvent amount so that the stay time in the reactor is 2 to 3 hours. 1-Butene was used as an α-olefin to identify the copolymerization characteristics. A small amount of hydrogen was added to control the molecular weight.

Two polyethylenes were prepared with different injection amount of the catalyst prepared in Example 7 (Examples 13 and 14). The activity, apparent density, density, molecular weight, molecular weight distribution and basic physical properties of each polyethylene are given in the following Table 3.

The catalyst of the present invention caused no process interruption due to fouling. The apparent density of the polymer was good, in the range of 0.3 to 0.5 g/mL.

TABLE 3

| Classification | | Example 13 | Example 14 |
|---|---|---|---|
| Catalyst | | Catalyst of Example 7 | Catalyst of Example 7 |
| Polymerization process | | Continuous hexane slurry polymerization | Continuous hexane slurry polymerizaion |
| Comonomer | | 1-Butene | 1-Butene |
| Activity (kg PE/g catalyst hr) | | 6.5 | 6.1 |
| Apparent density (g/cm$^3$) | | 0.38 | 0.40 |
| Density (g/cm$^3$) | | 0.945 | 0.952 |
| MI (2.16 kg) | | 0.02 | 2.0 |
| MI (21.6 kg) | | 1.42 | 90.10 |
| MI (21.6 kg)/MI (2.16 kg) | | 71 | 44 |
| Molecular weight distribution | | Bimodal | Bimodal |
| Mw/Mn | | 8.6 | 5.6 |
| Tensile characteristics | Tensile strength (kg/cm$^2$) | 280 | 175 |
| | Tensile elongation (%) | 890 | 650 |
| ESCR, F50 (%) | | >1,000 | >500 |
| Izod impact strength | Room temperature | NB | NB |
| | −20° C. | 25 | 14 |

The supported metallocene catalyst of the present invention has one site of the ligand of the first metallocene compound strongly attached to the silica surface by chemical bonding. And, since the second metallocene compound which is supported after activation strongly interacts with the activator, few catalyst leaches out of the surface during the polymerization process. Hence, there occurs no fouling, or sticking of the polymers to the reactor wall or one another, during the slurry polymerization or gas phase polymerization process. Also, the resultant polymer has superior particle shape and apparent density, so that it can be applied to the conventional slurry or gas phase polymerization process. The polyolefin prepared using the supported catalyst of the present invention has a variety of physical properties and molecular weight distribution, so that it can be molded into various products, including rotation molded products, injection molded products, films, containers, pipes and fibers. Particularly, the molecular weight distribution can be controlled with low production cost using a single reactor, thanks to the high polymerization activity.

While the present invention has been described in detail with reference to the preferred embodiments, those skilled in the art will appreciate that various modifications and substitutions can be made thereto without departing from the spirit and scope of the present invention as set forth in the appended claims.

The invention claimed is:

1. A supported hybrid metallocene catalyst with at least two different metallocene compounds supported on a single support, wherein:

at least one metallocene compound is supported on the support by a chemical bond of its ligand to the support surface; and the other metallocene compound is supported on the support by a chemical bond of its ligand to a cocatalyst chemically bonded to the support surface.

2. The supported hybrid metallocene catalyst according to claim 1, wherein said at least one metallocene compound is a catalyst for preparing low molecular weight polyolefin and the other is a catalyst for preparing high molecular weight polyolefin.

3. The supported hybrid metallocene catalyst according to claim 2, wherein the low molecular weight polyolefin has a molecular weight ranging from 1,000 to 100,000, and the high molecular weight polyolefin has a molecular weight higher than that of the low molecular weight polyolefin, ranging from 10,000 to 1,000,000.

4. The supported hybrid metallocene catalyst according to claim 1, wherein the supporting amount of the metallocene compounds is 0.1 to 20 wt % of the total supported hybrid metallocene catalyst weight, based on the weight of metals comprised in each metallocene compound.

5. The supported hybrid metallocene catalyst according to claim 1, wherein the supporting amount of said at least one metallocene compound is 0.01 to 100 mol for 1 mol of the other metallocene compound.

6. The supported hybrid metallocene catalyst according to claim 1, wherein the supported hybrid metallocene catalyst is further supported 1 to 10,000 mol of a cocatalyst component for polyolefin polymerization per 1 mol of metals comprised in the metallocene compound, based on the metal contained in the cocatalyst.

7. A supported hybrid metallocene catalyst for preparing polyolefin having a bimodal or broad molecular weight distribution, which is obtained by supporting a) a catalyst component on b) a support, wherein a) the catalyst component comprises:

i) a first metallocene compound having an acetal, ketal, tertiary alkoxyalkyl, benzyloxyalkyl, substituted benzyloxyalkyl, monothioacetal or monothioketal group;

ii) a second metallocene compound having a bridge linkage containing a Lewis base in cyclopentadiene, a cyclopentadiene derivative or a bridge group; and iii) an organometallic compound containing a group XIII metal; and b) the support has siloxane groups on the surface, on which the catalyst component is supported.

8. The supported hybrid metallocene catalyst for preparing polyolefin according to claim 7, wherein the first metallocene compound is a compound represented by the following Chemical Formula 1:

$(C_5R^1)_p(C_5R^2)MQ_{3-p}$ Chemical Formula 1 wherein:

M is a group IV transition metal;

each of $(C_5R^1)$ and $(C_5R^2)$ is cyclopentadienyl; cyclopentadienyl wherein two neighboring carbon atoms of $C_5$ are connected by a hydrocarbyl radical to form one or more $C_4$ to $C_{16}$ rings; or a substituted cyclopentadienyl ligand;

each of $R^1$ and $R^2$ is identical or different and a substituent selected from hydrogen radical, $C_1$ to $C_{40}$ alkyl, cycloalkyl, aryl, alkenyl, alkylaryl, arylalkyl, or arylalkenyl radical; and at least one hydrogen radical comprised in the substituent of $R^1$ and $R^2$ is further substituted by a radical represented by the following Chemical Formula a, the following Chemical Formula b, or the following Chemical Formula c;

Q is a halogen radical; a $C_1$ to $C_{20}$ alkyl radical, alkenyl radical, aryl radical, alkylaryl radical, arylalkyl radical; or a $C_1$ to $C_{20}$ alkylidene radical; and P is 0 or 1:

Chemical Formula a

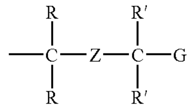

wherein:

Z is an oxygen atom or a sulfur atom;

each of R and R' is identical or different hydrogen radical; $C_1$ to $C_{40}$ alkyl, cycloalkyl, aryl, alkenyl, alkylaryl, arylalkyl; or arylalkenyl radical; and the two R's may be connected to form a ring;

G is a $C_1$ to $C_{40}$ alkoxy, aryloxy, alkylthio, arylthio, phenyl or substituted phenyl, and may be connected to R' to form a ring;

if Z is a sulfur atom, G should be alkoxy or aryloxy; and if G is alkylthio, arylthio, phenyl or substituted phenyl, Z should be an oxygen atom;

Chemical Formula b

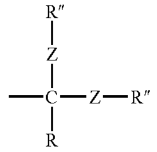

wherein

Z is an oxygen atom or a sulfur atom, and at least one of the two Zs is an oxygen atom;

each of R and R" is identical or different hydrogen radical; $C_1$ to $C_{40}$ alkyl, cycloalkyl, aryl, alkenyl, alkylaryl, arylalkyl or arylalkenyl radical;

R and R" may be connected to form a ring; and unless both R"s are hydrogen radicals, they may be connected to form a ring; and Chemical Formula c

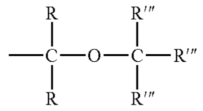

wherein:

each of R and R'" is identical or different hydrogen radical; $C_1$ to $C_{40}$ alkyl, cycloalkyl, aryl, alkenyl, alkylaryl, arylalkyl or arylalkenyl radical;

two neighboring R'"s may be connected to form a ring; and if at least one of Rs is a hydrogen radical, all R'"s are not hydrogen radicals, and if at least one of R'"s is a hydrogen radical, all Rs are not hydrogen radical.

9. The supported hybrid metallocene catalyst for preparing polyolefin according to claim 7, wherein the first metallocene compound is $[A—O—(CH_2)_a—C_5H_4]_2ZrCl_2$ or $[A—O—(CH_2)_a—C_9H_6]ZrCl_3$, wherein each a is an integer of 4 to 8, and each A is methoxymethyl, t-butoxymethyl, tetrahydropyranyl, tetrahydrofuranyl, 1-ethoxyethyl, 1-methyl-1-methoxyethyl or t-butyl.

10. The supported hybrid metallocene catalyst for preparing polyolefin according to claim 7, wherein the first metallocene compound is one of the following compounds:

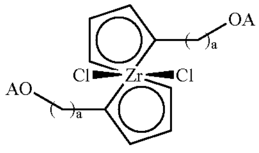
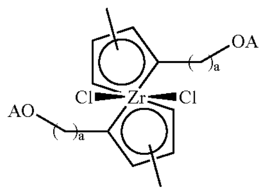
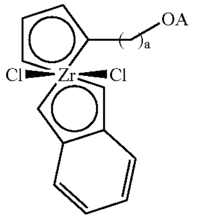
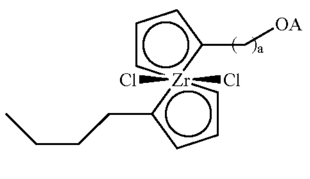
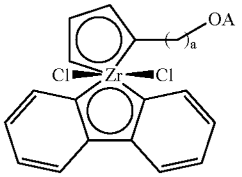
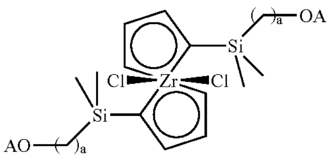
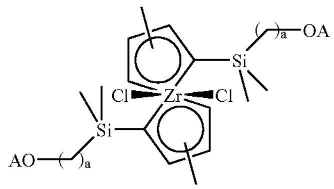
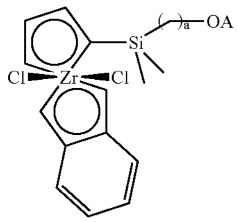
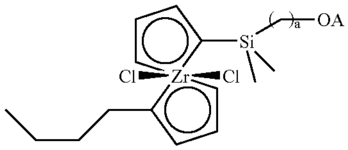
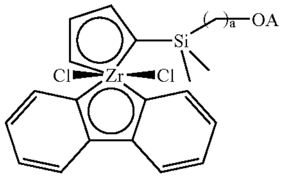
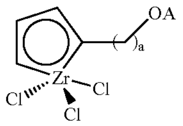
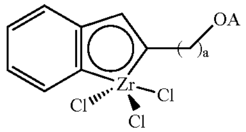
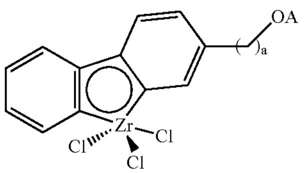

wherein each a is an integer 4 to 8, and each A is methoxymethyl, t-butoxymethyl, tetrahydropyranyl, tetrahydrofuranyl, 1-ethoxyethyl, 1-methyl-1-methoxyethyl or t-butyl.

11. The supported hybrid metallocene catalyst for preparing polyolefin according to claim 7, wherein the second metallocene compound is a compound represented by the following Chemical Formula 2 or Chemical Formula 3:

Chemical Formula 2

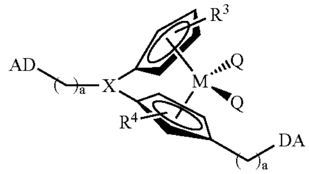

Chemical Formula 3

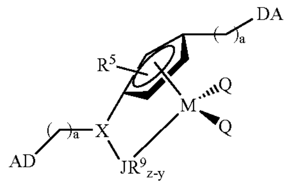

wherein:

M is a group IV transition metal;

each of ($C_5R^3$), ($C_5R^4$) and ($C_5R^5$) is a cyclopentadienyl; a cyclopentadienyl wherein two neighboring carbon atoms of $C_5$ are connected by a hydrocarbyl radical to form one or more $C_4$ to $C_{16}$ ring; or a substituted cyclopentadienyl ligand;

each of $R^3$, $R^4$, and $R^5$ is identical or different and a substituent selected from hydrogen radical, $C_1$ to $C_{40}$ alkyl cycloalkyl, aryl, alkenyl, alkylaryl, arylalkyl, or arylalkenyl radical; and at least one hydrogen radical comprised in the substituent of $R^3$, $R^4$, and $R^5$ is further substituted by a radical represented by the following Chemical Formula a, the following Chemical Formula b, the following Chemical Formula c, or the following Chemical Formula d;

each Q is identical or different halogen radical; $C_1$ to $C_{20}$ alkyl radical, alkenyl radical, aryl radical, alkylaryl radical, arylalkyl radical; or $C_1$ to $C_{20}$ alkylidene radical;

X is a bridge for binding two cyclopentadienyl ligands or a cyclopentadienyl ligand and $JR^9_{z-y}$ by a covalent bond, which is a radical having the formula of $C_mH_{2m-1}$, monoalkyl silicon, monoalkyl germanium, phosphine, or amine, wherein m is an integer of 1 to 4:

$R^9$ is a hydrogen radical, a $C_1$ to $C_{20}$ alkyl radical, an alkenyl radical, an aryl radical, an alkylaryl radical or an arylalkyl radical;

J is a group XV element or a group XVI element;

D is an oxygen or amine;

A is a hydrogen radical, a $C_1$ to $C_{20}$ alkyl radical, an alkenyl radical, an aryl radical, an alkylaryl radical, an arylalkyl radical, an alkylsilyl radical, an arylsilyl radical, methoxymethyl, t-butoxymethyl, tetrahydropyranyl, tetrahydrofuranyl, 1-ethoxyethyl, 1-methyl-1-methoxyethyl or t-butyl; and a is an integer of 4 to 8:

Chemical Formula a

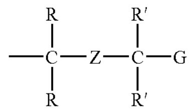

wherein:

Z is an oxygen atom or a sulfur atom;

each of R and R' is identical or different hydrogen radical; $C_1$ to $C_{40}$ alkyl, cycloalkyl, aryl, alkenyl, alkylaryl, arylalkyl; or arylalkenyl radical; and the two R's may be connected to form a ring;

G is a $C_1$ to $C_{40}$ alkoxy, aryloxy, alkylthio, arylthio, phenyl or substituted phenyl, and may be connected to R' to form a ring;

if Z is a sulfur atom, G should be alkoxy or aryloxy; and if G is alkylthio, arylthio, phenyl or substituted phenyl, Z should be an oxygen atom;

Chemical Formula b

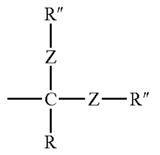

wherein

Z is an oxygen atom or a sulfur atom, and at least one of the two Zs is an oxygen atom;

each of R and R" is identical or different hydrogen radical; $C_1$ to $C_{40}$ alkyl, cycloalkyl, aryl, alkenyl, alkylaryl, arylalkyl or arylalkenyl radical;

R and R" may be connected to form a ring; and unless both R"s are hydrogen radicals, they may be connected to form a ring;

Chemical Formula c

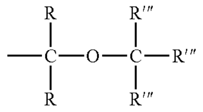

wherein:

each of R and R''' is identical or different hydrogen radical; $C_1$ to $C_{40}$ alkyl, cycloalkyl, aryl, alkenyl, alkylaryl, arylalkyl or arylalkenyl radical;

two neighboring R'''s may be connected to form a ring; and if at least one of Rs is a hydrogen radical, all R'''s are not hydrogen radicals, and if at least one of R'''s is a hydrogen radical, all Rs are not hydrogen radical; and Chemical Formula d

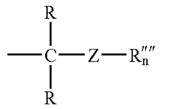

wherein:

Z is an oxygen, sulfur, nitrogen, phosphorus or arsenic atom;

each of R is identical or different hydrogen radical, $C_1$ to $C_{40}$ alkyl, cycloalkyl, aryl, alkenyl, alkylaryl, arylalkyl or arylalkenyl radical;

R'''' is a hydrogen radical or $C_1$ to $C_{40}$ alkyl, aryl, alkenyl, alkylaryl, alkylsilyl, arylsilyl, phenyl or substituted phenyl; and n is 1 or 2, where if Z is oxygen or sulfur n is 1, and if Z is nitrogen, phosphorus or arsenic n is 2.

12. The supported hybrid metallocene catalyst for preparing polyolefin according to claim 7, wherein the second metallocene compound is $[(A—D—(CH_2)_a)(CH_3)X(C_5H_4)(9\text{-}C_{13}H_9)]ZrCl_2$ or $[(A—D—(CH_2)_a)](CH_3)X(C_5Me_4)(NCMe_3)]TiCl_2$, wherein each a is an integer of 4 to 8, each X is C, CHCH or silicon, each D is an oxygen or amine, and each A is hydrogen, $C_1$ to $C_{20}$ alkyl, alkenyl, aryl, alkylaryl, arylalkyl, alkylsilyl, arylsilyl, methoxymethyl, t-butoxymethyl, tertrahydropyranyl, tetrahydrofuranyl, 1-ethoxyethyl, 1-methyl-1-methoxyethyl or t-butyl.

13. The supported hybrid metallocene catalyst for preparing polyolefin according to claim 7, wherein the second metallocene compound is one of the following compounds:

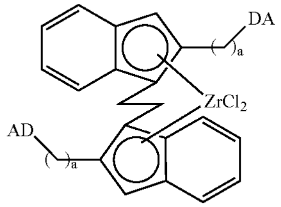

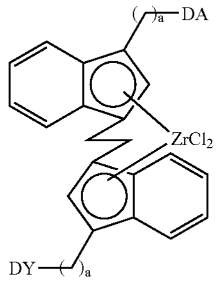

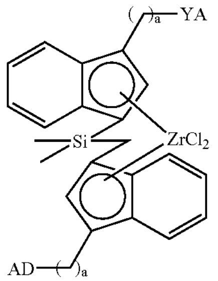

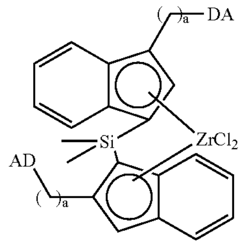

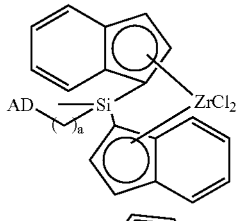

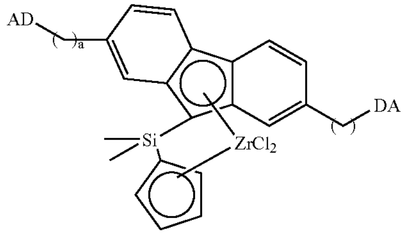

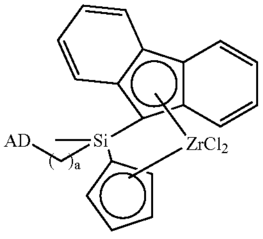

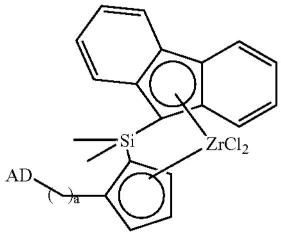

-continued

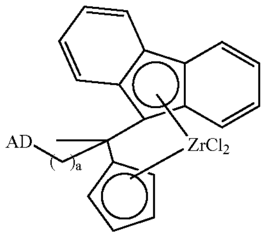

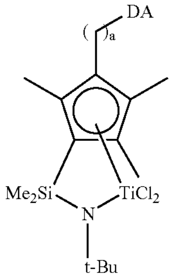

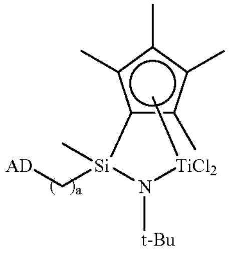

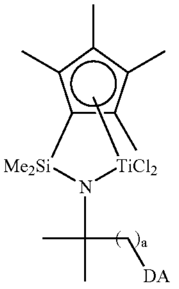

wherein each a is an integer of 4 to 8, each D is an oxygen or amine, and each A is a hydrogen radical, a $C_1$ to $C_{20}$ alkyl radical, an alkenyl radical, an aryl radical, an alkylaryl radical an arylalkyl radical, an alkylsilyl radical, an arylsilyl radical, methoxymethyl, t-butoxymethyl, tetrahydropyranyl, tetrahydrofuranyl, 1-ethoxyethyl, 1-methyl-1-methoxyethyl or t-butyl.

14. The supported hybrid metallocene catalyst for preparing polyolefin according to claim 7, wherein the cocatalyst is a compound selected from a group consisting of compounds represented by the following Chemical Formula 4, Chemical Formula 5 and Chemical Formula 6:

$$[Al(R^6)—O]_n— \qquad \text{Chemical Formula 4}$$

wherein:

$R^6$ is a $C_1$ to $C_{20}$ hydrocarbyl radical substituted by identical or different halogen radical, $C_1$ to $C_{20}$ hydrocarbyl radical or halogen; and a is an integer larger than 2;

$$M'(R^7)_3 \qquad \text{Chemical Formula 5}$$

wherein:

M' is aluminum or boron; and $R^7$ is a $C_1$ to $C_{20}$ hydrocarbyl radical substituted by identical or different halogen radical, $C_1$ to $C_{20}$ hydrocarbyl radical or halogen; and $$[L—H]^+[M'E_4]^- \text{ or } [L]^+[M'E_4]^- \qquad \text{Chemical Formula 6}$$

wherein:

L is a neutral or cationic Lewis acid;

H is a hydrogen atom;

M' is a group XIII element, such as aluminum and boron; and

E is a $C_6$ to $C_{40}$ aryl radical substituted by one or more $C_1$ to $C_{20}$ hydrocarbyl radicals containing a halogen radical, $C_1$ to $C_{20}$ hydrocarbyl, alkoxy, phenoxy radical, nitrogen, phosphorus, sulfur or oxygen atom, and the four Es may be identical or different.

15. The supported hybrid metallocene catalyst for preparing polyolefin according to claim 14, wherein the compound represented by Chemical Formula 4 is methylaluminoxane (MAO), ethylaluminoxane, isobutylaluminoxane or butylaluminoxane.

16. The supported hybrid metallocene catalyst for preparing polyolefin according to claim 14, wherein the compound represented by Chemical Formula 5 is trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron or tributylboron.

17. The supported hybrid metallocene catalyst for preparing polyolefin according to claim 14, wherein the compound represented by Chemical Formula 6 is triethylammoniumtetraphenylboron, tributylammoniumtetraphenylboron, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra (p-trifluoromethylphenyl)boron, trimethylammoniumtetra (p-trifluoromethylphenyl)boron, tributylammonium tetrapentafluorophenylboron, N,N-diethylaniliniumtetraphenylboron, N,N-diethylaniliniumtetraphenylboron, N,N-diethylanilinium tetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetraphenylaluminum, N,N-diethylaniliniumtetrapentafluorophenylaluminum, diethylammonium tetrapentafluorophenylaluminum, triphenylphosphoniumtetraphenylaluminum, trimethylphosphoniumtetraphenylaluminum, triethylammoniumtetraphenylboron, tri butylammoniumtetraphenylboron, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammonium tetrapentafluorophenylboron, triphenylphosphoniumtetraphenylboron, triphenylcarboniumtetraphenylboron, triphenylcarboniumtetraphenylaluminum, triphenylcarboniumtetra(p-trifluoromethylphenyl)boron or triphenylcarbonium tetrapentafluorophenylboron.

18. The supported hybrid metallocene catalyst for preparing polyolefin according to claim 7, wherein the support is dried at high temperature ranging from 300 to 1,000° C. and has highly reactive siloxane groups on the surface.

19. The supported hybrid metallocene catalyst for preparing polyolefin according to claim 7, wherein the support is silica, silica-alumina or silica-magnesia.

20. The supported hybrid metallocene catalyst for preparing polyolefin according to claim 7, wherein the support has 0.1 to 1 mmol/g of alcohol groups (—OH) on the surface.

21. The supported hybrid metallocene catalyst for preparing polyolefin according to claim 20, wherein the support has 0.1 to 0.5 mmol/g of alcohol groups (—OH) on the surface.

22. The supported hybrid metallocene catalyst for preparing polyolefin according to claim 7, wherein the supporting amount of the first metallocene compound and the second metallocene compound is 0.1 to 20 wt % of the total supported hybrid metallocene catalyst weight, based on the weight of group IV metals comprised in each compound.

23. The supported hybrid metallocene catalyst for preparing polyolefin according to claim 7, wherein the supporting amount of the cocatalyst is 1 to 10,000 mol of the group XIII metal for 1 mol of the group IV metal comprised in the second metallocene compound.

24. The supported hybrid metallocene catalyst for preparing polyolefin according to claim 7, wherein the supporting amount of the second metallocene compound is 0.01 to 100 mol for 1 mol of the first metallocene compound.

25. The supported hybrid metallocene catalyst for preparing polyolefin according to claim 7, which has been prepolymerized by contact with an olefinic monomer.

26. A method for preparing a supported hybrid metallocene catalyst for preparing polyolefin having a bimodal or broad molecular weight distribution, which comprises:

a) a step of preparing a first supported catalyst by supporting a first metallocene compound having an acetal, ketal, tertiary alkoxyalkyl, benzyloxyalkyl, substituted benzyloxyalkyl, monothioacetal or monothioketal functional group on a support having siloxane groups on the surface;

b) a step of preparing an activated first supported catalyst by contacting the first supported catalyst with an organometallic compound cocatalyst containing a group XIII metal; and c) a step of supporting a second metallocene compound having a bridge linkage containing at least one Lewis base in cyclopentadiene, a cyclopentadiene derivative or a bridge group on the activated first supported catalyst to prepare a supported hybrid metallocene catalyst wherein the first metallocene compound and the second metallocene compound are supported.

27. A method for preparing a supported hybrid metallocene catalyst for preparing polyolefin having a bimodal or broad molecular weight distribution, which comprises:

a) a step of supporting a first metallocene compound having an acetal, ketal, tertiary alkoxyalkyl, benzyloxyalkyl, substituted benzyloxyalkyl, monothioacetal or monothioketal functional group on a support having siloxane groups on the surface to prepare a first supported catalyst;

b) a step of contacting a second metallocene compound having a bridge linkage containing at least one Lewis base in cyclopentadiene, a cyclopentadiene derivative or a bridge group with an organometallic compound cocatalyst containing a group XIII metal to prepare an activated second metallocene compound; and c) a step of supporting the activated second metallocene compound on the first supported catalyst to prepare a supported hybrid metallocene catalyst wherein the first metallocene compound and the second metallocene compound are supported.

28. The method for preparing a supported hybrid metallocene catalyst according to claim 26, wherein the first metallocene compound is a compound represented by the following Chemical Formula 1:

$(C_5R^1)_p(C_5R^2)MQ_{3-p}$ Chemical Formula 1 wherein:

M is a group IV transition metal;

each of $(C_5R^1)$ and $(C_5R^2)$ is cyclopentadienyl; cyclopentadienyl wherein two neighboring carbon atoms of $C_5$ are connected by a hydrocarbyl radical to form one or more $C_4$ to $C_{16}$ rings; or a substituted cyclopentadienyl ligand;

each of $R^1$ and $R^2$ is identical or different and a substituent selected from hydrogen radical, $C_1$ to $C_{40}$ alkyl cycloalkyl, aryl, alkenyl, alkylaryl, arylalkyl, or arylalkenyl radical; and at least one hydrogen radical comprised in the substituent of $R^1$ and $R^2$ is further substituted by a radical represented by the following Chemical Formula a, the following Chemical Formula b, or the following Chemical Formula c;

Q is a halogen radical; a $C_1$ to $C_{20}$ alkyl radical, alkenyl radical, aryl radical, alkylaryl radical, arylalkyl radical; or a $C_1$ to $C_{20}$ alkylidene radical; and P is 0 or 1:

Chemical Formula a

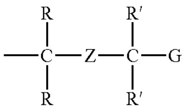

wherein:

Z is an oxygen atom or a sulfur atom;

each of R and R' is identical or different hydrogen radical; $C_1$ to $C_{40}$ alkyl, cycloalkyl, aryl, alkenyl, alkylaryl, arylalkyl; or arylalkenyl radical; and the two R's may be connected to form a ring;

G is a $C_1$ to $C_{40}$ alkoxy, aryloxy, alkylthio, arylthio, phenyl or substituted phenyl, and may be connected to R' to form a ring;

if Z is a sulfur atom, G should be alkoxy or aryloxy; and if G is alkylthio, arylthio, phenyl or substituted phenyl, Z should be an oxygen atom;

Chemical Formula b

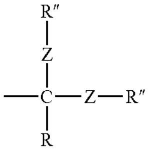

wherein

Z is an oxygen atom or a sulfur atom, and at least one of the two Zs is an oxygen atom;

each of R and R" is identical or different hydrogen radical; $C_1$ to $C_{40}$ alkyl, cycloalkyl, aryl, alkenyl, alkylaryl, arylalkyl or arylalkenyl radical;

R and R" may be connected to form a ring; and unless both R"s are hydrogen radicals, they may be connected to form a ring; and Chemical Formula c

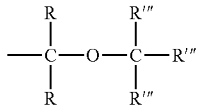

wherein:

each of R and R''' is identical or different hydrogen radical; $C_1$ to $C_{40}$ alkyl, cycloalkyl, aryl, alkenyl, alkylaryl, arylalkyl or arylalkenyl radical;

two neighboring R'''s may be connected to form a ring; and if at least one Rs is a hydrogen radical, all R'''s are not hydrogen radicals, and if at least one of R'''s is a hydrogen radical, all Rs are not hydrogen radical.

29. The method for preparing a supported hybrid metallocene catalyst according to claim 26, wherein the first metallocene compound is $[A—O—(CH_2)_a—C_5H_4]_2ZrCl_2$ or $[A—O—(CH_2)_a—C_9H_6]ZrCl_3$, wherein each a is an integer of 4 to 8, and each A is methoxymethyl, t-butoxymethyl, tetrahydropyranyl, tetrahydrofuranyl, 1-ethoxyethyl, 1-methyl-1-methoxyethyl or t-butyl.

30. The method for preparing a supported hybrid metallocene catalyst according to claim 26, wherein the first metallocene compound is one of the following compounds:

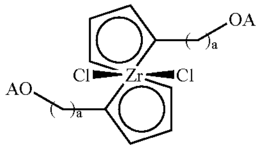

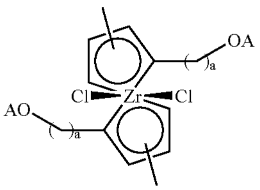

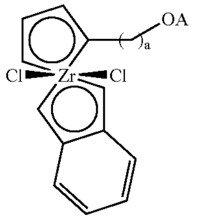

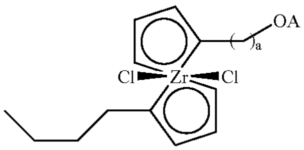

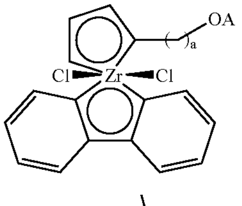

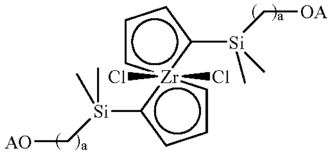

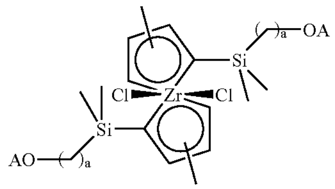

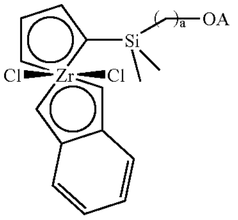

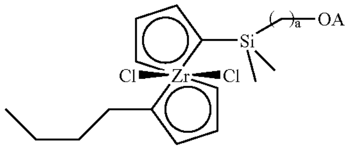

-continued

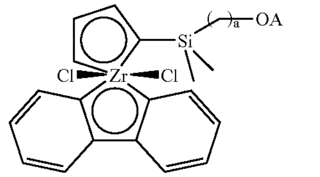

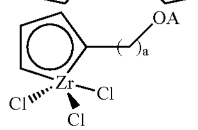

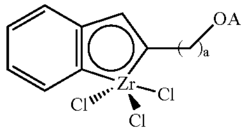

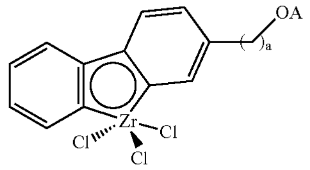

wherein each a is an integer 4 to 8, and each A is methoxymethyl, t-butoxymethyl, tetrahydropyranyl, tetrahydrofuranyl, 1-ethoxyethyl, 1-methyl-1-methoxyethyl or t-butyl.

31. The method for preparing a supported hybrid metallocene catalyst according to claim 26, wherein the second metallocene compound is a compound represented by the following Chemical Formula 2 or Chemical Formula 3:

Chemical Formula 2

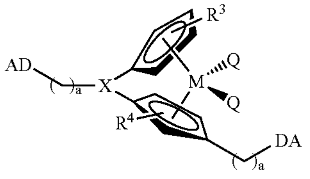

Chemical Formula 3

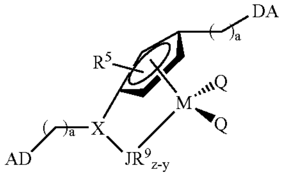

wherein:

M is a group IV transition metal;

each of $(C_5R^3)$, $(C_5R^4)$ and $(C_5R^5)$ is a cyclopentadienyl; a cyclopentadienyl wherein two neighboring carbon atoms of $C_5$ are connected by a hydrocarbyl radical to form one or more $C_4$ to $C_{16}$ ring; or a substituted cyclopentadienyl ligand;

each of $R^3$, $R^4$, and $R^5$ is identical or different and a substituent selected from hydrogen radical, $C_1$ to $C_{40}$ alkyl, cycloalkyl, aryl, alkenyl, alkylaryl, arylalkyl, or arylalkenyl radical; and at least one hydrogen radical comprised in the substituent of $R^3$, $R^4$, and $R^5$ is further substituted by a radical represented by the following Chemical Formula a, the following Chemical Formula b, the following Chemical Formula c, or the following Chemical Formula d;

each Q is identical or different halogen radical; $C_1$ to $C_{20}$ alkyl radical, alkenyl radical, aryl radical, alkylaryl radical, arylalkyl radical; or $C_1$ to $C_{20}$ alkylidene radical;

X is a bridge for binding two cyclopentadienyl ligands or a cyclopentadienyl ligand and $JR^9_{z-y}$ by a covalent bond, which is a radical having the formula of $C_mH_{2m-1}$, monoalkyl silicon, monoalkyl germanium, phosphine, or amine, wherein m is an integer of 1 to 4;

$R^9$ is a hydrogen radical, a $C_1$ to $C_{20}$ alkyl radical, an alkenyl radical, an aryl radical, an alkylaryl radical or an arylalkyl radical;

J is a group XV element or a group XVI element;

D is an oxygen or amine;

A is a hydrogen radical, a $C_1$ to $C_{20}$ alkyl radical, an alkenyl radical, an aryl radical, an alkylaryl radical, an arylalkyl radical, an alkylsilyl radical, an arylsilyl radical, methoxymethyl, t-butoxymethyl, tetrahydropyranyl, tetrahydrofuranyl, 1-ethoxyethyl, 1-methyl-1-methoxyethyl or t-butyl; and a is an integer of 4 to 8:

Chemical Formula a

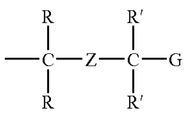

wherein:

Z is an oxygen atom or a sulfur atom;

each of R and R' is identical or different hydrogen radical; $C_1$ to $C_{40}$ alkyl, cycloalkyl, aryl, alkenyl, alkylaryl, arylalkyl; or arylalkenyl radical; and the two R's may be connected to form a ring;

G is a $C_1$ to $C_{40}$ alkoxy, aryloxy, alkylthio, arylthio, phenyl or substituted phenyl, and may be connected to R' to form a ring;

if Z is a sulfur atom, G should be alkoxy or aryloxy; and if G is alkylthio, arylthio, phenyl or substituted phenyl, Z should be an oxygen atom;

Chemical Formula b

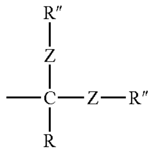

wherein

Z is an oxygen atom or a sulfur atom, and at least one of the two Zs is an oxygen atom;

each of R and R" is identical or different hydrogen radical; $C_1$ to $C_{40}$ alkyl, cycloalkyl, aryl, alkenyl, alkylaryl, arylalkyl or arylalkenyl radical;

R and R" may be connected to form a ring; and unless both R"s are hydrogen radicals, they may be connected to form a ring;

Chemical Formula c

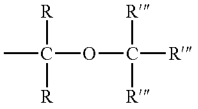

wherein:

each of R and R''' is identical or different hydrogen radical; $C_1$ to $C_{40}$ alkyl, cycloalkyl, aryl, alkenyl, alkylaryl, arylalkyl or arylalkenyl radical;

two neighboring R'''s may be connected to form a ring; and if at least one of Rs is a hydrogen radical, all R'''s are not hydrogen radicals, and if at least one of R'''s is a hydrogen radical, all Rs are not hydrogen radical; and Chemical Formula d

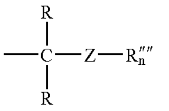

wherein:

Z is an oxygen, sulfur, nitrogen, phosphorus or arsenic atom;

each of R is identical or different hydrogen radical, $C_1$ to $C_{40}$ alkyl, cycloalkyl, aryl, alkenyl, alkylaryl, arylalkyl or arylalkenyl radical;

R'''' is a hydrogen radical or $C_1$ to $C_{40}$ alkyl, aryl, alkenyl, alkylaryl, alkylsilyl, arylsilyl, phenyl or substituted phenyl; and n is 1 or 2, where if Z is oxygen or sulfur n is 1, and if Z is nitrogen, phosphorus or arsenic n is 2.

32. The method for preparing a supported hybrid metallocene catalyst according to claim 26, wherein the second metallocene compound is $[A—D—(CH_2)_a)(CH_3)X(C_5H_4)(9\text{-}C_{13}H_9)]ZrCl_2$ or $[A—D—(CH_2)_a)](CH_3)X(C_5Me_4)(NCMe_3)]TiCl_2$, wherein each a is an integer of 4 to 8, each X is C, CHCH or silicon, each D is an oxygen or amine, and each A is hydrogen, $C_1$ to $C_{20}$ alkyl, alkenyl, aryl, alkylaryl, arylalkyl, alkylsilyl, arylsilyl, methoxymethyl, t-butoxymethyl, tertahydropyranyl, tetrahydrofuranyl, 1-ethoxyethyl, 1-methyl-1-methoxyethyl or t-butyl.

33. The method for preparing a supported hybrid metallocene catalyst according to claim 26, wherein the second metallocene compound is one of the following compounds:

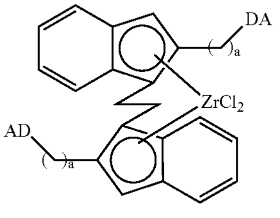

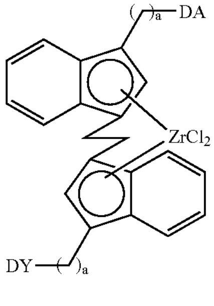

-continued

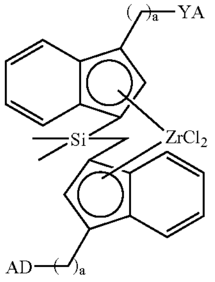

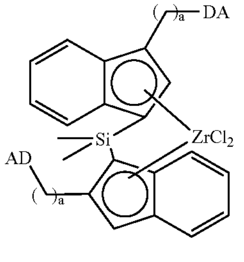

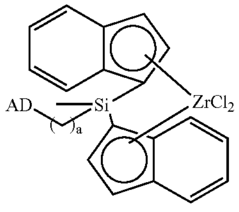

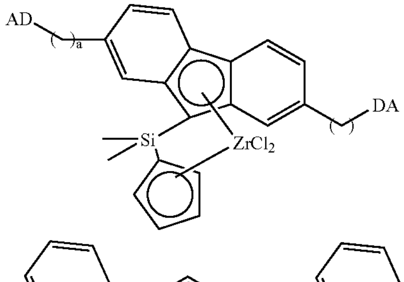

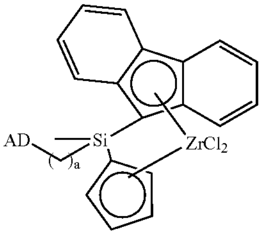

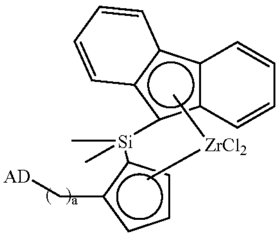

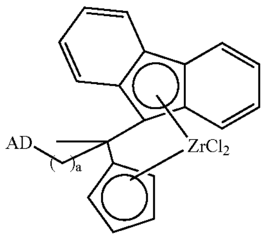

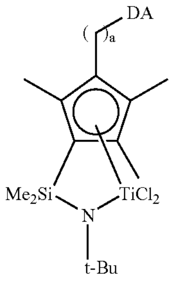

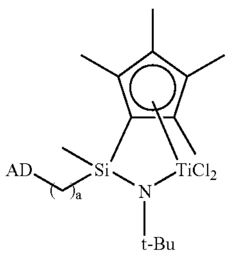

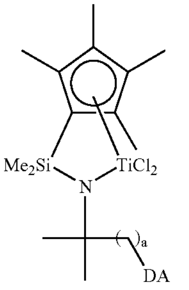

wherein each a is an integer of 4 to 8, each D is an oxygen or amine, and each A is a hydrogen radical, a $C_1$ to $C_{20}$ alkyl radical, an alkenyl radical, an aryl radical, an alkylaryl radical, an arylalkyl radical, an alkylsilyl radical, an arylsilyl radical, methoxymethyl, t-butoxymethyl, tetrahydropyranyl, tetrahydrofuranyl, 1-ethoxyethyl, 1-methyl-1-methoxyethyl or t-butyl.

34. The method for preparing a supported hybrid metallocene catalyst according to claim 26, wherein the cocatalyst is a compound selected from a group consisting of compounds represented by the following Chemical Formula 4, Chemical Formula 5 and Chemical Formula 6:

$-[Al(R^6)-O]_n-$ Chemical Formula 4 wherein:

$R^6$ is a $C_1$ to $C_{20}$ hydrocarbyl radical substituted by identical or different halogen radical, $C_1$ to $C_{20}$ hydrocarbyl radical or halogen; and a is an integer larger than 2;

$M'(R^7)_3$ Chemical Formula 5 wherein:

M' is aluminum or boron; and $R^7$ is a $C_1$ to $C_{20}$ hydrocarbyl radical substituted by identical or different halogen radical, $C_1$ to $C_{20}$ hydrocarbyl radical or halogen; and $[L-H]^+[M'E_4]^-$ or $[L]^+[M'E_4]^-$ Chemical Formula 6 wherein:

L is a neutral or cationic Lewis acid;

H is a hydrogen atom;

M' is a group XIII element, such as aluminum and boron; and

E is a $C_6$ to $C_{40}$ aryl radical substituted by one or more $C_1$ to $C_{20}$ hydrocarbyl radicals containing a halogen radical, $C_1$ to $C_{20}$ hydrocarbyl, alkoxy, phenoxy radical, nitrogen, phosphorus, sulfur or oxygen atom, and the four Es may be identical or different.

35. The method for preparing a supported hybrid metallocene catalyst according to claim 26, wherein the support is dried at high temperature ranging from 300 to 1,000° C. and has highly reactive siloxane groups on the surface.

36. The method for preparing a supported hybrid metallocene catalyst according to claim 26, wherein the support is silica, silica-alumina or silica-magnesia.

37. The method for preparing a supported hybrid metallocene catalyst according to claim 26, wherein the support has 0.1 to 10 mmol/g of alcohol groups (—OH) on the surface.

38. The method for preparing a supported hybrid metallocene catalyst according to claim 26, wherein the supporting amount of the first metallocene compound and the second metallocene compound is 0.1 to 20 wt % of the total supported hybrid metallocene catalyst weight, based on the weight of group IV metals comprised in each compound.

39. The method for preparing a supported hybrid metallocene catalyst according to claim 26, wherein the supporting amount of the cocatalyst is 1 to 10,000 mol of the group XIII metal for 1 mol of the group IV metal comprised in the second metallocene compound.

40. The method for preparing a supported hybrid metallocene catalyst according to claim 26, wherein the supporting amount of the second metallocene compound is 0.01 to 100 mol for 1 mol of the first metallocene compound.

41. The method for preparing a supported hybrid metallocene catalyst according to claim 26, which further comprises a step of contacting the supported hybrid metallocene catalyst with an olefinic monomer to prepare a pre-polymerized catalyst.

42. A method for olefin polymerization comprising a step of polymerizing an olefinic monomer in the presence of a supported hybrid metallocene catalyst wherein at least two different metallocene compounds, which comprise a first metallocene compound whose ligand is supported to the support surface by chemical bonding, a second metallocene compound whose ligand is supported to a cocatalyst, which is chemically bonded to the support surface, by chemical bonding, a cocatalyst and a support, are supported on a single support.

43. The method for olefin polymerization according to claim 42, wherein the first metallocene compound is a catalyst for low molecular weight polyolefin polymerization and the second metallocene compound is a catalyst for high molecular weight polyolefin polymerization.

44. The method for olefin polymerization according to claim 43, wherein the low molecular weight polyolefin has a molecular weight ranging from 1,000 to 100,000, and the high molecular weight polyolefin has a molecular weight higher than that of the low molecular weight polyolefin, ranging from 10,000 to 1,000,000.

45. The method for olefin polymerization according to claim 42, wherein the first metallocene compound is supported on the support by a chemical bond of its ligand to the support surface; and the second metallocene compound is supported on the support by a chemical bond of its ligand to a cocatalyst chemically bonded to the support surface.

46. The method for olefin polymerization according to claim 42, wherein the supporting amount of the metallocene compounds is 0.1 to 20 wt % of the total supported hybrid metallocene catalyst weight, based on the weight of metals comprised in each metallocene compound.

47. The method for olefin polymerization according to claim 42, wherein the supporting amount of said at least one metallocene compound is 0.01 to 100 mol for 1 mol of the other metallocene compound.

48. The method for olefin polymerization according to claim 42, wherein a cocatalyst component for polyolefin polymerization is further supported on the supported hybrid metallocene catalyst.

49. The method for olefin polymerization according to claim 48, wherein the supporting amount of the cocatalyst is 1 to 10,000 mol for 1 mol of metals comprised in the metallocene compound.

50. A method for preparing polyolefin having a bimodal or broad molecular weight distribution, which comprises a step of polymerizing an olefinic monomer in the presence of the supported hybrid metallocene catalyst according to claim 7.

51. The method for preparing polyolefin according to claim 50, wherein the supported hybrid metallocene catalyst has been pre-polymerized by contact with an olefinic monomer.

52. The method for preparing polyolefin according to claim 50, wherein the polymerization is performed in a single reactor.

53. The method for preparing polyolefin according to claim 50, wherein the polymerization is performed by a slurry process or a gas phase process.

54. The method for preparing polyolefin according to claim 50, wherein the polymerization is performed at a temperature ranging from 25 to 500° C.

55. The method for preparing polyolefin according to claim 50, wherein the polymerization is performed at a pressure ranging from 1 to 100 $Kgf/cm^2$.

56. The method for preparing polyolefin according to claim 50, wherein the supported hybrid metallocene catalyst is diluted in a $C_5$ to $C_{12}$ aliphatic hydrocarbon solvent, aromatic hydrocarbon solvent or hydrocarbon solvent substituted by a chlorine atom into a slurry, and then injected to an olefinic monomer.

57. The method for preparing polyolefin according to claim 50, wherein the olefinic monomer is selected from a group consisting of α-olefin, cyclic olefin, a dienic olefinic monomer and a trienic olefinic monomer.

58. The method for preparing polyolefin according to claim 50, wherein the polyolefin has a molecular weight distribution (Mw/Mn) ranging from 3 to 50.

59. The method for preparing a supported hybrid metallocene catalyst according to claim 27, wherein the first metallocene compound is a compound represented by the following Chemical Formula 1:

$$(C_5R^1)_p(C_5R^2)MQ_{3-p}$$ Chemical Formula 1 wherein:

M is a group IV transition metal;

each of $(C_5R^1)$ and $(C_5R^2)$ is cyclopentadienyl; cyclopentadienyl wherein two neighboring carbon atoms of $C_5$ are connected by a hydrocarbyl radical to form one or more $C_4$ to $C_{16}$ rings; or a substituted cyclopentadienyl ligand;

each of $R^1$ and $R^2$ is identical or different and a substituent selected from hydrogen radical, $C_1$ to $C_{40}$ alkyl, cycloalkyl, aryl, alkenyl, alkylaryl, arylalkyl, or arylalkenyl radical; and at least one hydrogen radical comprised in the substituent of $R^1$ and $R^2$ is further substituted by a radical represented by the following Chemical Formula a, the following Chemical Formula b, or the following Chemical Formula c;

Q is a halogen radical; a $C_1$ to $C_{20}$ alkyl radical, alkenyl radical, aryl radical, alkylaryl radical, arylalkyl radical; or a $C_1$ to $C_{20}$ alkylidene radical; and P is 0 or 1:

Chemical Formula a

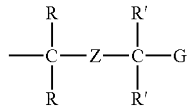

wherein:

Z is an oxygen atom or a sulfur atom;

each of R and R' is identical or different hydrogen radical; $C_1$ to $C_{40}$ alkyl, cycloalkyl, aryl, alkenyl, alkylaryl, arylalkyl; or arylalkenyl radical; and the two R's may be connected to form a ring;

G is a $C_1$ to $C_{40}$ alkoxy, aryloxy, alkylthio, arylthio, phenyl or substituted phenyl, and may be connected to R' to form a ring;

if Z is a sulfur atom, G should be alkoxy or aryloxy; and if G is alkylthio, arylthio, phenyl or substituted phenyl, Z should be an oxygen atom;

Chemical Formula b

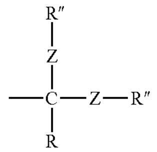

wherein

Z is an oxygen atom or a sulfur atom, and at least one of the two Zs is an oxygen atom;

each of R and R" is identical or different hydrogen radical; $C_1$ to $C_{40}$ alkyl, cycloalkyl, aryl, alkenyl, alkylaryl, arylalkyl or arylalkenyl radical;

R and R" may be connected to form a ring; and unless both R"s are hydrogen radicals, they may be connected to form a ring; and Chemical Formula c

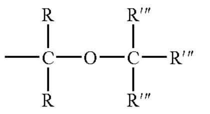

wherein:

each of R and R''' is identical or different hydrogen radical; $C_1$ to $C_{40}$ alkyl, cycloalkyl, aryl, alkenyl, alkylaryl, arylalkyl or arylalkenyl radical;

two neighboring R'''s may be connected to form a ring; and if at least one of Rs is a hydrogen radical, all R'''s are not hydrogen radicals, and if at least one of R'''s is a hydrogen radical, all Rs are not hydrogen radical.

60. The method for preparing a supported hybrid metallocene catalyst according to claim 27, wherein the first metallocene compound is $[A—O—(CH_2)_a—C_5H_4]_2ZrCl_2$ or $[A—O—(CH_2)_a—C_9H_6]ZrCl_3$, wherein each a is an integer of 4 to 8, and each A is methoxymethyl, t-butoxymethyl, tetrahydropyranyl, tetrahydrofuranyl, 1-ethoxyethyl, 1-methyl-1-methoxyethyl or t-butyl.

61. The method for preparing a supported hybrid metallocene catalyst according to claim 27, wherein the first metallocene compound is one of the following compounds:

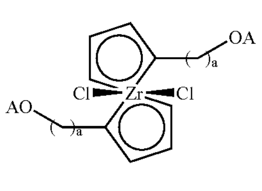
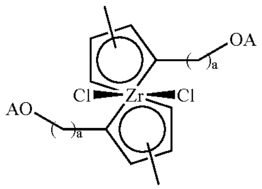
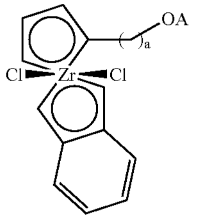
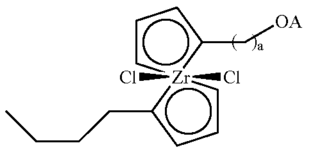
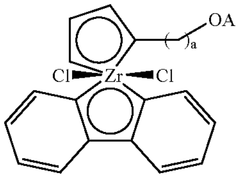
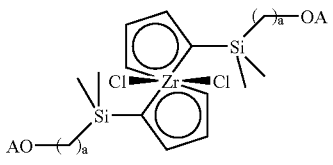

-continued

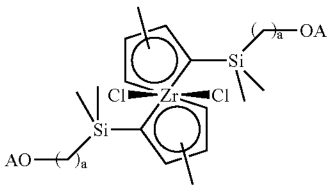
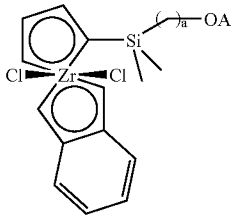
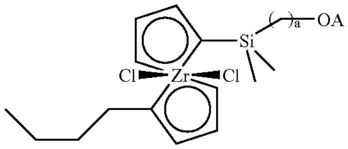
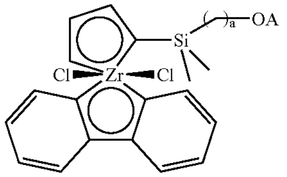
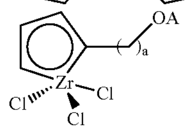
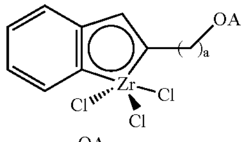
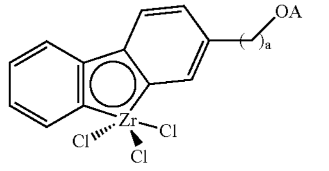

wherein each a is an integer 4 to 8, and each A is methoxymethyl, t-butoxymethyl, tetrahydropyranyl, tetrahydrofuranyl, 1-ethoxyethyl, 1-methyl-1-methoxyethyl or t-butyl.

62. The method for preparing a supported hybrid metallocene catalyst according to claim 27, wherein the second metallocene compound is a compound represented by the following Chemical Formula 2 or Chemical Formula 3:

Chemical Formula 2

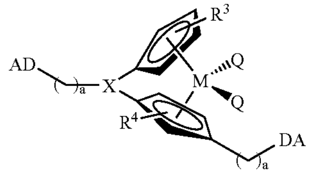

Chemical Formula 3

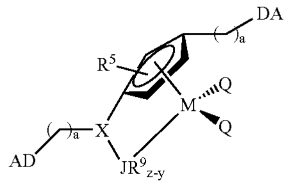

wherein:

M is a group IV transition metal;

each of $(C_5R^3)$, $(C_5R^4)$ and $(C_5R^5)$ is a cyclopentadienyl; a cyclopentadienyl wherein two neighboring carbon atoms of $C_5$ are connected by a hydrocarbyl radical to form one or more $C_4$ to $C_{16}$ ring; or a substituted cyclopentadienyl ligand;

each of $R^3$, $R^4$, and $R^5$ is identical or different and a substituent selected from hydrogen radical, $C_1$ to $C_{40}$ alkyl, cycloalkyl, aryl, alkenyl, alkylaryl, arylalkyl, or arylalkenyl radical; and at least one hydrogen radical comprised in the substituent of $R^3$, $R^4$, and $R^5$ is further substituted by a radical represented by the following Chemical Formula a, the following Chemical Formula b, the following Chemical Formula c, or the following Chemical Formula d;

each Q is identical or different halogen radical; $C_1$ to $C_{20}$ alkyl radical, alkenyl radical, aryl radical, alkylaryl radical, arylalkyl radical; or $C_1$ to $C_{20}$ alkylidene radical;

X is a bridge for binding two cyclopentadienyl ligands or a cyclopentadienyl ligand and $JR^9_{z-y}$ by a covalent bond, which is a radical having the formula of $C_mH_{2m-1}$, monoalkyl silicon, monoalkyl germanium, phosphine, or amine, wherein m is an integer of 1 to 4;

$R^9$ is a hydrogen radical, a $C_1$ to $C_{20}$ alkyl radical, an alkenyl radical, an aryl radical, an alkylaryl radical or an arylalkyl radical;

J is a group XV element or a group XVI element;

D is an oxygen or amine;

A is a hydrogen radical, a $C_1$ to $C_{20}$ alkyl radical, an alkenyl radical, an aryl radical, an alkylaryl radical, an arylalkyl radical, an alkylsilyl radical, an arylsilyl radical, methoxymethyl, t-butoxymethyl, tetrahydropyranyl, tetrahydrofuranyl, 1-ethoxyethyl, 1-methyl-1-methoxyethyl or t-butyl; and a is an integer of 4 to 8:

Chemical Formula a

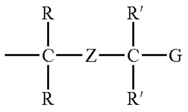

wherein:

Z is an oxygen atom or a sulfur atom;

each of R and R' is identical or different hydrogen radical; $C_1$ to $C_{40}$ alkyl, cycloalkyl, aryl, alkenyl, alkylaryl, arylalkyl; or arylalkenyl radical; and the two R's may be connected to form a ring;

G is a $C_1$ to $C_{40}$ alkoxy, aryloxy, alkylthio, arylthio, phenyl or substituted phenyl, and may be connected to R' to form a ring;

if Z is a sulfur atom, G should be alkoxy or aryloxy; and if G is alkylthio, arylthio, phenyl or substituted phenyl, Z should be an oxygen atom;

Chemical Formula b

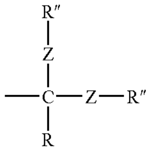

wherein

Z is an oxygen atom or a sulfur atom, and at least one of the two Zs is an oxygen atom;

each of R and R" is identical or different hydrogen radical; $C_1$ to $C_{40}$ alkyl, cycloalkyl, aryl, alkenyl, alkylaryl, arylalkyl or arylalkenyl radical;

R and R" may be connected to form a ring; and unless both R"s are hydrogen radicals, they may be connected to form a ring;

Chemical Formula c

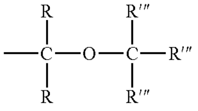

wherein:

each of R and R'" is identical or different hydrogen radical; $C_1$ to $C_{40}$ alkyl, cycloalkyl, aryl, alkenyl, alkylaryl, arylalkyl or arylalkenyl radical;

two neighboring R'"s may be connected to form a ring; and if at least one of Rs is a hydrogen radical, all R'"s are not hydrogen radicals, and if at least one of R'"s is a hydrogen radical, all Rs are not hydrogen radical; and Chemical Formula d

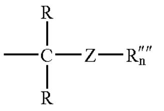

wherein:

Z is an oxygen, sulfur, nitrogen, phosphorus or arsenic atom;

each of R is identical or different hydrogen radical, $C_1$ to $C_{40}$ alkyl, cycloalkyl, aryl, alkenyl, alkylaryl, arylalkyl or arylalkenyl radical;

R"" is a hydrogen radical or $C_1$ to $C_{40}$ alkyl, aryl, alkenyl, alkylaryl, alkylsilyl, arylsilyl, phenyl or substituted phenyl; and n is 1 or 2, where if Z is oxygen or sulfur n is 1, and if Z is nitrogen, phosphorus or arsenic n is 2.

63. The method for preparing a supported hybrid metallocene catalyst according to claim 27, wherein the second metallocene compound is $[(A—D—(CH_2)_a)(CH_3)X(C_5H_4)(9\text{-}C_{13}H_9)]ZrCl_2$ or $[(A—D—(CH_2)_a)](CH_3)X(C_5Me_4)(NCMe_3)]TiCl_2$, wherein each a is an integer of 4 to 8, each X is C, CHCH or silicon, each D is an oxygen or amine, and each A is hydrogen, $C_1$ to $C_{20}$ alkyl, alkenyl, aryl, alkylaryl, arylalkyl, alkylsilyl, arylsilyl, methoxymethyl, t-butoxymethyl, tertahydropyranyl, tetrahydrofuranyl, 1-ethoxyethyl, 1-methyl-1-methoxyethyl or t-butyl.

64. The method for preparing a supported hybrid metallocene catalyst according to claim 27, wherein the second metallocene compound is one of the following compounds:

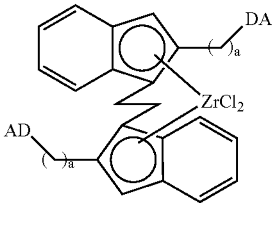

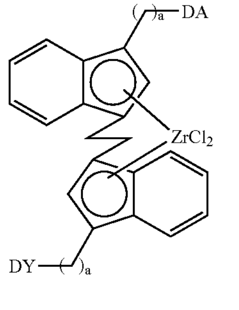

-continued

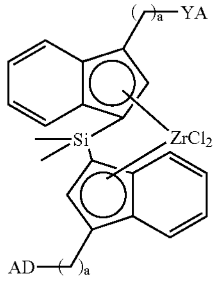

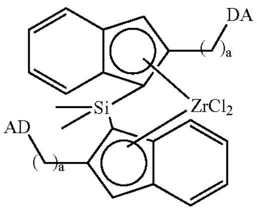

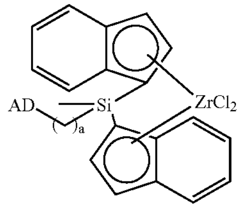

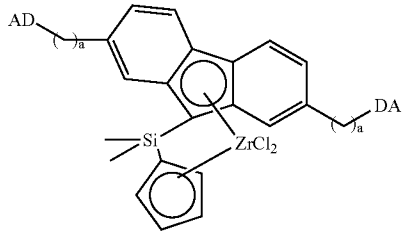

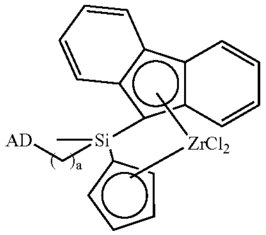

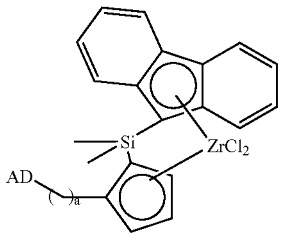

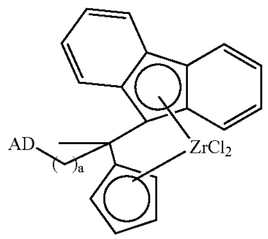

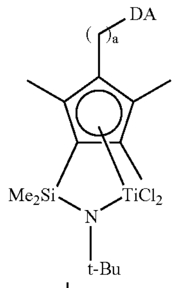

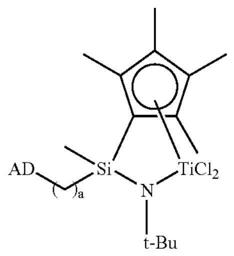

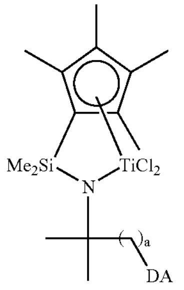

wherein each a is an integer of 4 to 8, each D is an oxygen or amine, and each A is a hydrogen radical, a $C_1$ to $C_{20}$ alkyl radical, an alkenyl radical, an aryl radical, an alkylaryl radical, an arylalkyl radical, an alkylsilyl radical, an arylsilyl radical, methoxymethyl, t-butoxymethyl, tetrahydropyranyl, tetrahydrofuranyl, 1-ethoxyethyl, 1-methyl-1-methoxyethyl or t-butyl.

65. The method for preparing a supported hybrid metallocene catalyst according to claim 27, wherein the cocatalyst is a compound selected from a group consisting of compounds represented by the following Chemical Formula 4, Chemical Formula 5 and Chemical Formula 6:

$—[Al(R^6)—O]_n—$ Chemical Formula 4 wherein:

$R^6$ is a $C_1$ to $C_{20}$ hydrocarbyl radical substituted by identical or different halogen radical, $C_1$ to $C_{20}$ hydrocarbyl radical or halogen; and a is an integer larger than 2;

$M'(R^7)_3$ Chemical Formula 5 wherein:

M' is aluminum or boron; and $R^7$ is a $C_1$ to $C_{20}$ hydrocarbyl radical substituted by identical or different halogen radical, $C_1$ to $C_{20}$ hydrocarbyl radical or halogen; and $[L—H]^+[M'E_4]^-$ or $[L]^+[M'E_4]^-$ Chemical Formula 6 wherein:

L is a neutral or cationic Lewis acid;

H is a hydrogen atom;

M' is a group XIII element, such as aluminum and boron; and

E is a $C_6$ to $C_{40}$ aryl radical substituted by one or more $C_1$ to $C_{20}$ hydrocarbyl radicals containing a halogen radical, $C_1$ to $C_{20}$ hydrocarbyl, alkoxy, phenoxy radical, nitrogen, phosphorus, sulfur or oxygen atom, and the four Es may be identical or different.

66. The method for preparing a supported hybrid metallocene catalyst according to claim 27, wherein the support is dried at high temperature ranging from 300 to 1,000° C. and has highly reactive siloxane groups on the surface.

67. The method for preparing a supported hybrid metallocene catalyst according to claim 27, wherein the support is silica, silica-alumina or silica-magnesia.

68. The method for preparing a supported hybrid metallocene catalyst according to claim 27, wherein the support has 0.1 to 10 mmol/g of alcohol groups (—OH) on the surface.

69. The method for preparing a supported hybrid metallocene catalyst according to claim 27, wherein the supporting amount of the first metallocene compound and the second metallocene compound is 0.1 to 20 wt % of the total supported hybrid metallocene catalyst weight, based on the weight of group IV metals comprised in each compound.

70. The method for preparing a supported hybrid metallocene catalyst according to claim 27, wherein the supporting amount of the cocatalyst is 1 to 10,000 mol of the group XIII metal for 1 mol of the group IV metal comprised in the second metallocene compound.

71. The method for preparing a supported hybrid metallocene catalyst according to claim 27, wherein the supporting amount of the second metallocene compound is 0.01 to 100 mol for 1 mol of the first metallocene compound.

72. The method for preparing a supported hybrid metallocene catalyst according to claim 27, which further comprises a step of contacting the supported hybrid metallocene catalyst with an olefinic monomer to prepare a pre-polymerized catalyst.

* * * * *